March 31, 1959  B. N. PIERCE  2,879,733
LUBRICATION SYSTEMS
Filed Nov. 21, 1951  13 Sheets-Sheet 1

Inventor:
Bernard N. Pierce
By Church & Church
His Attorneys

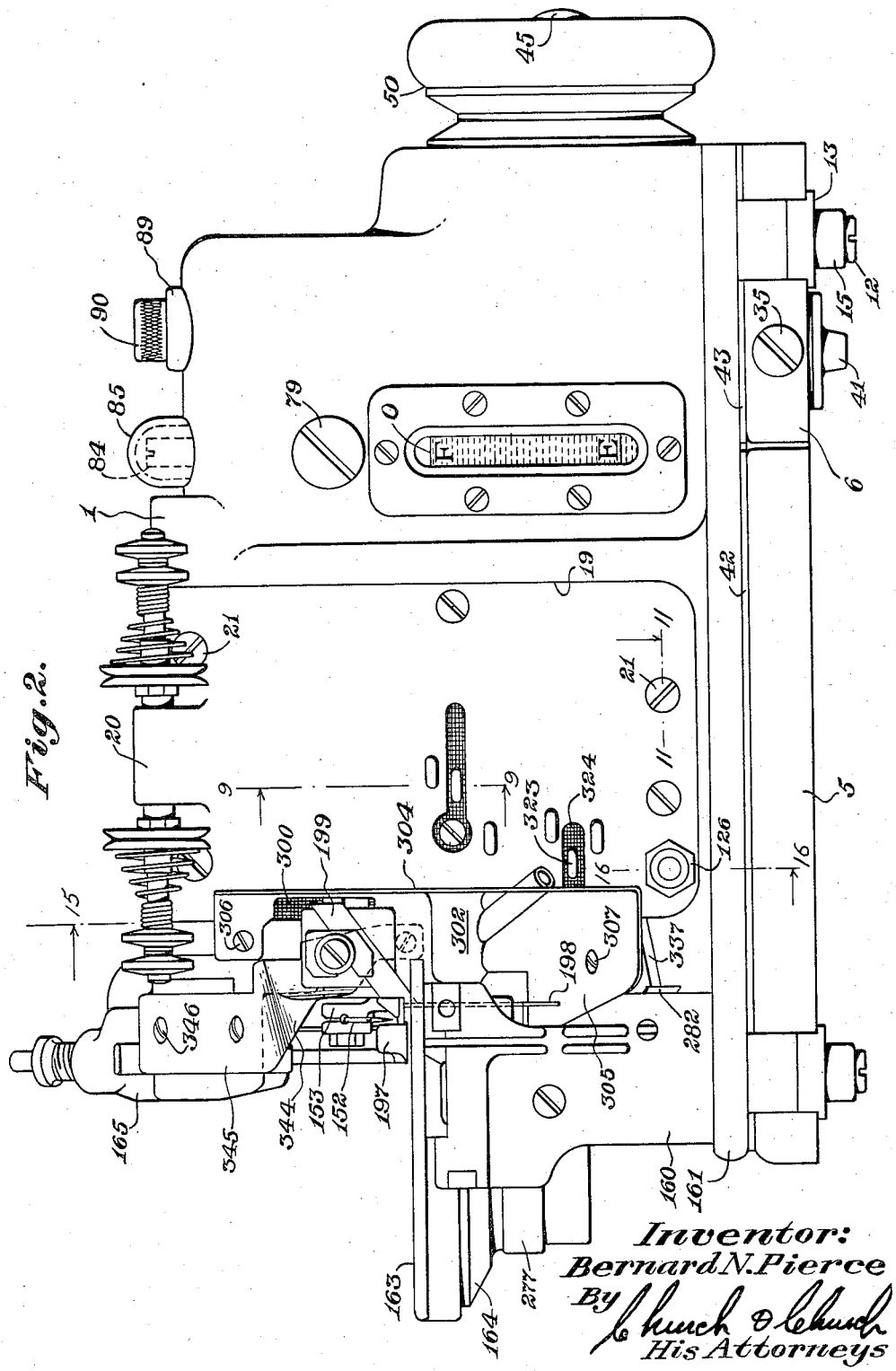

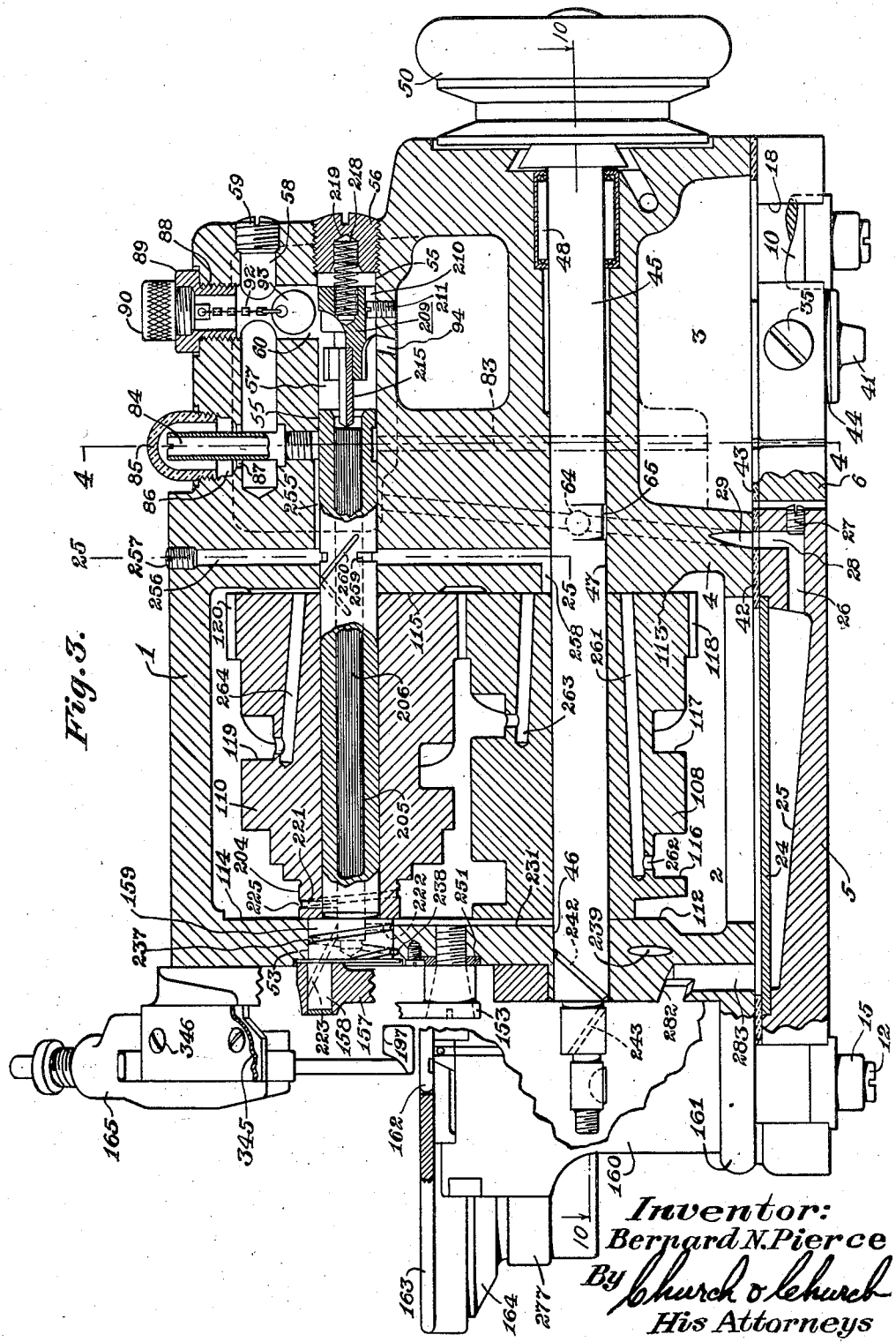

March 31, 1959 B. N. PIERCE 2,879,733
LUBRICATION SYSTEMS
Filed Nov. 21, 1951 13 Sheets-Sheet 4

Inventor:
Bernard N. Pierce
By Church & Church
His Attorneys

March 31, 1959     B. N. PIERCE     2,879,733
LUBRICATION SYSTEMS

Filed Nov. 21, 1951     13 Sheets-Sheet 5

Inventor:
Bernard N. Pierce
By Church & Church
His Attorneys

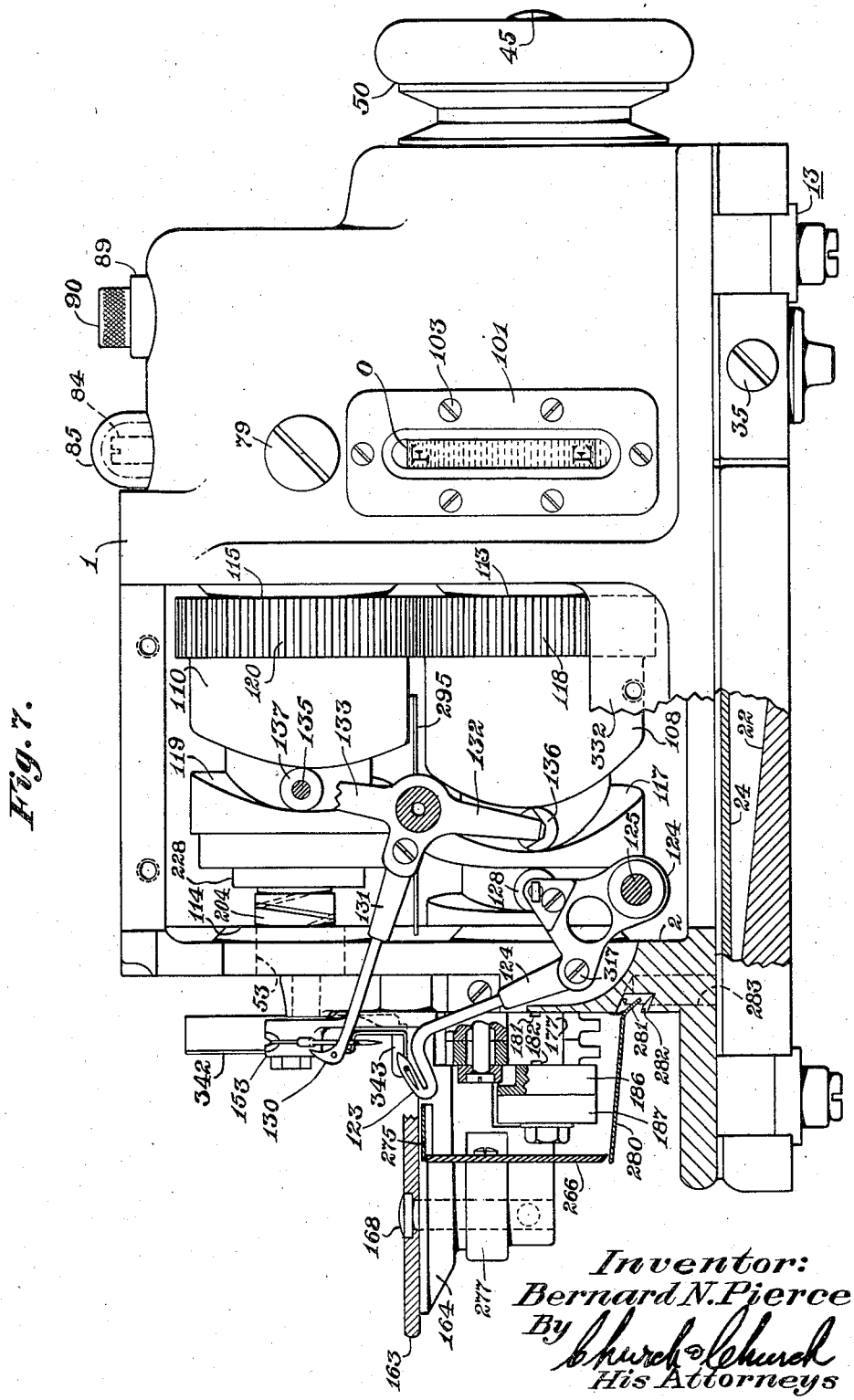

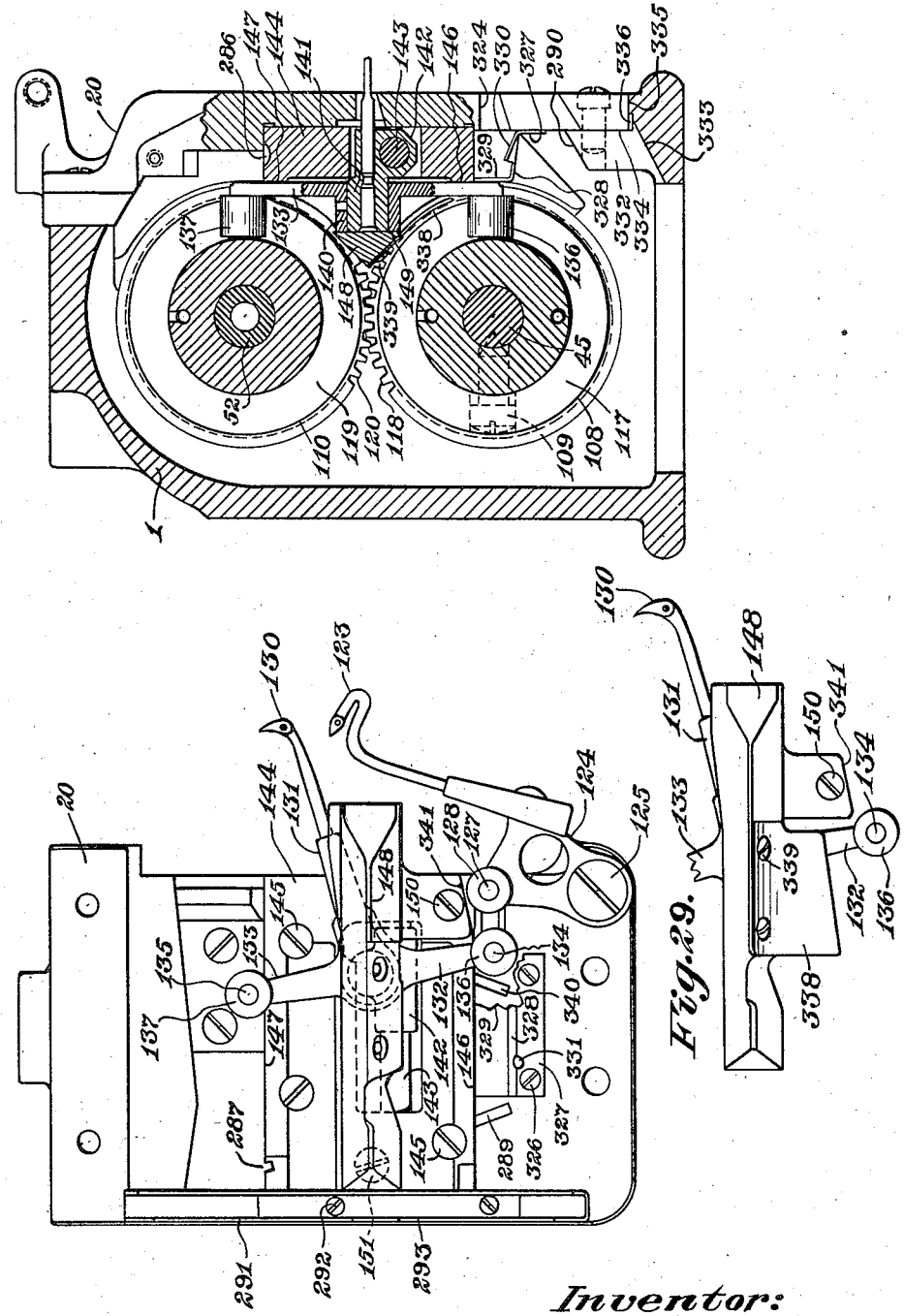

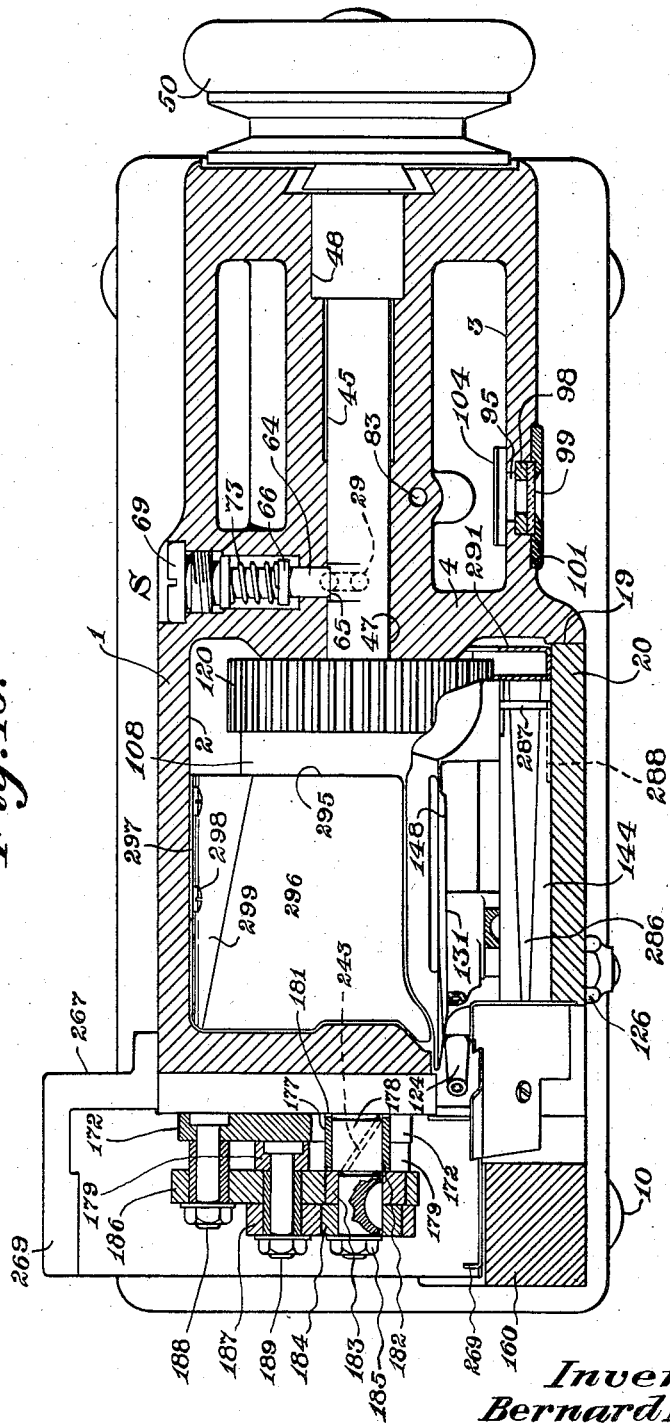

March 31, 1959   B. N. PIERCE   2,879,733
LUBRICATION SYSTEMS
Filed Nov. 21, 1951                                 13 Sheets-Sheet 9
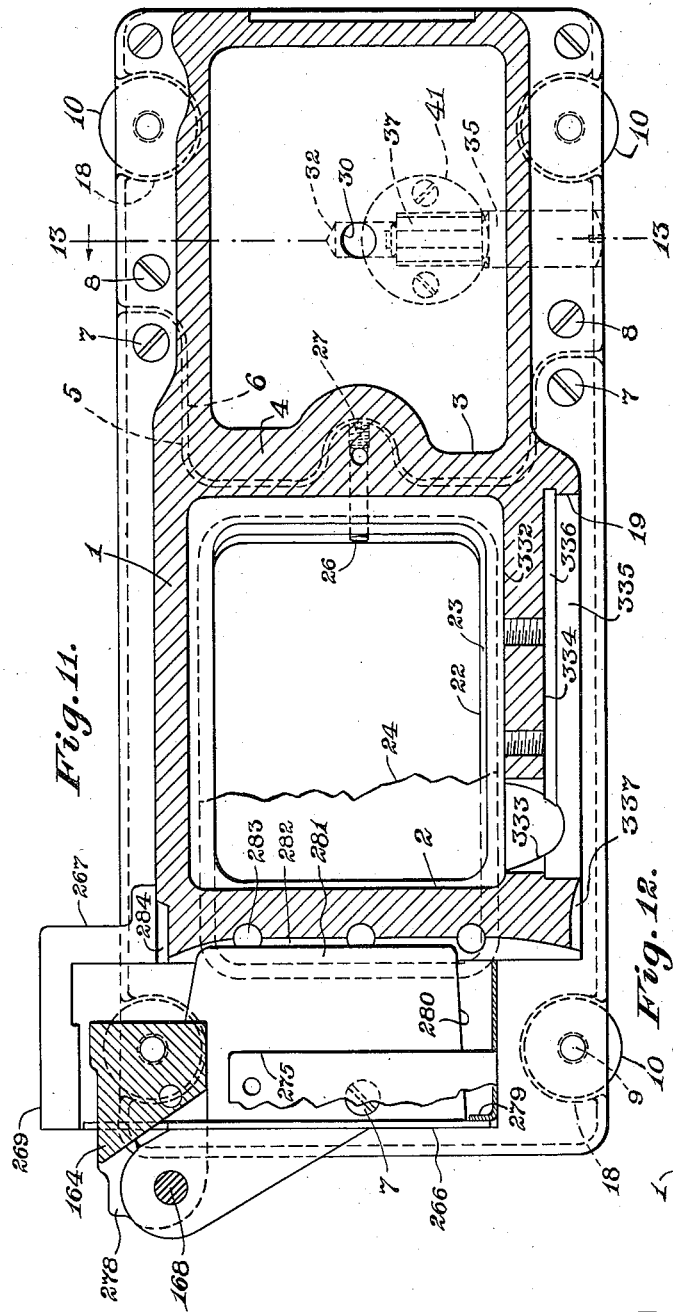
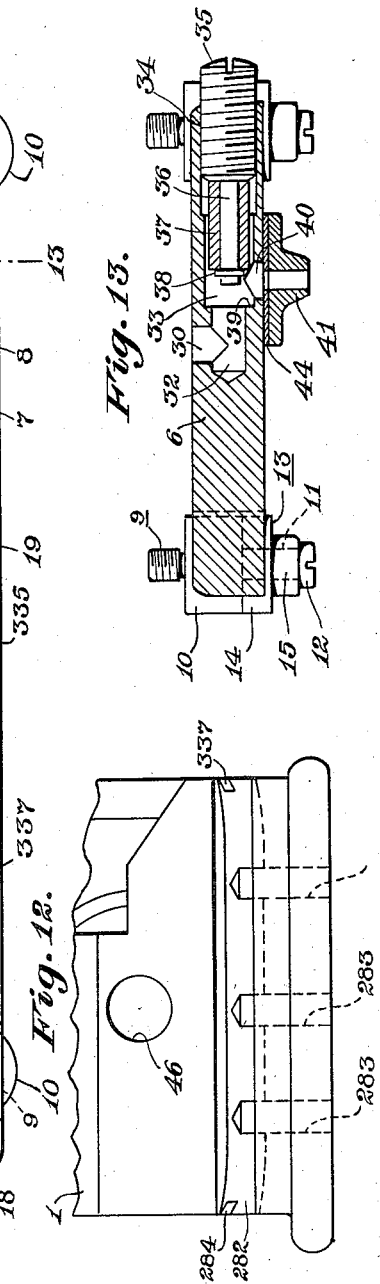
Inventor:
Bernard N. Pierce
By Church & Church
His Attorneys

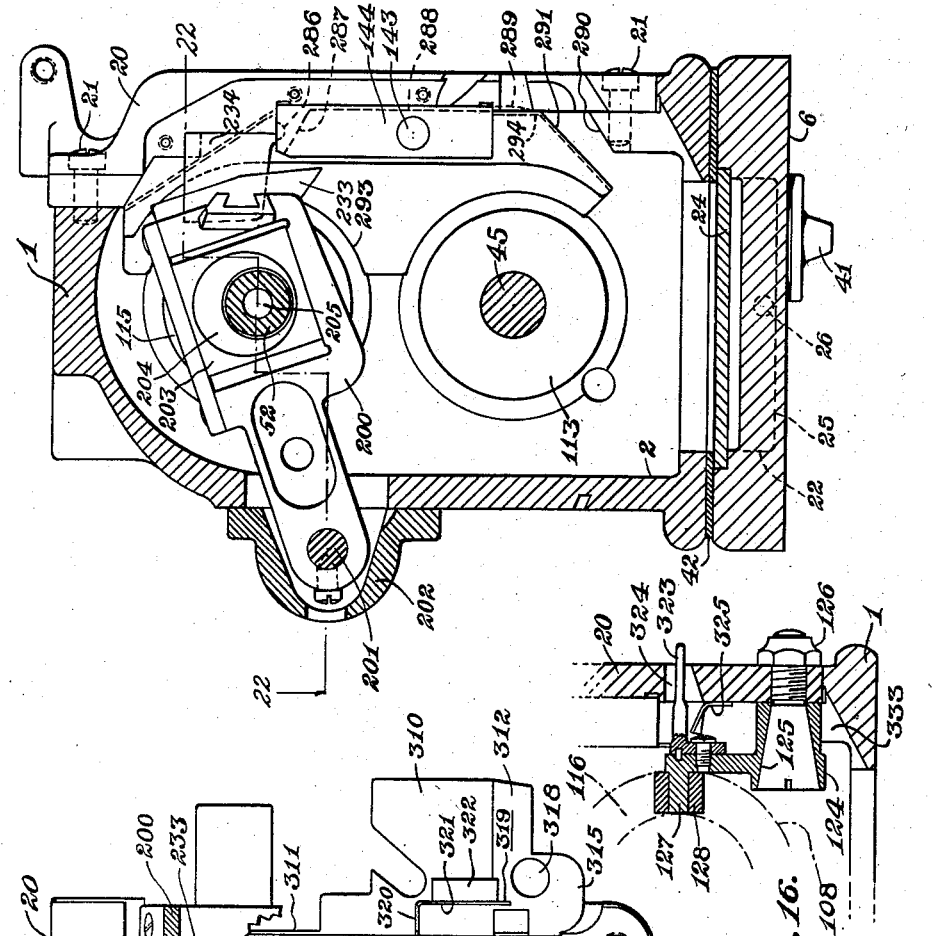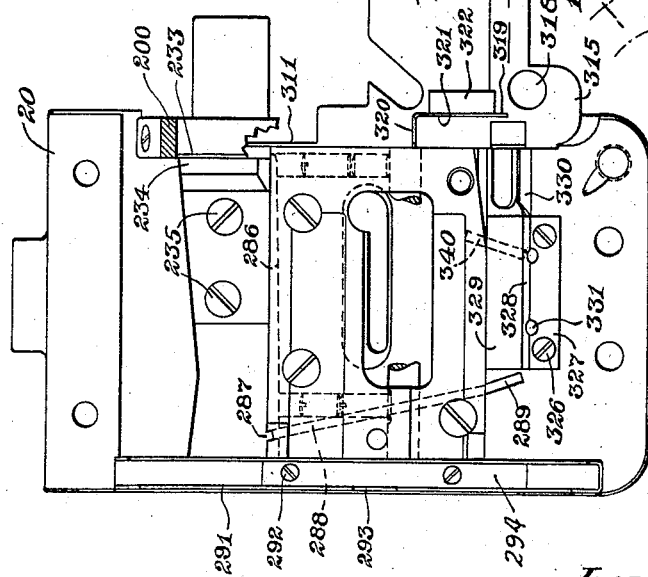

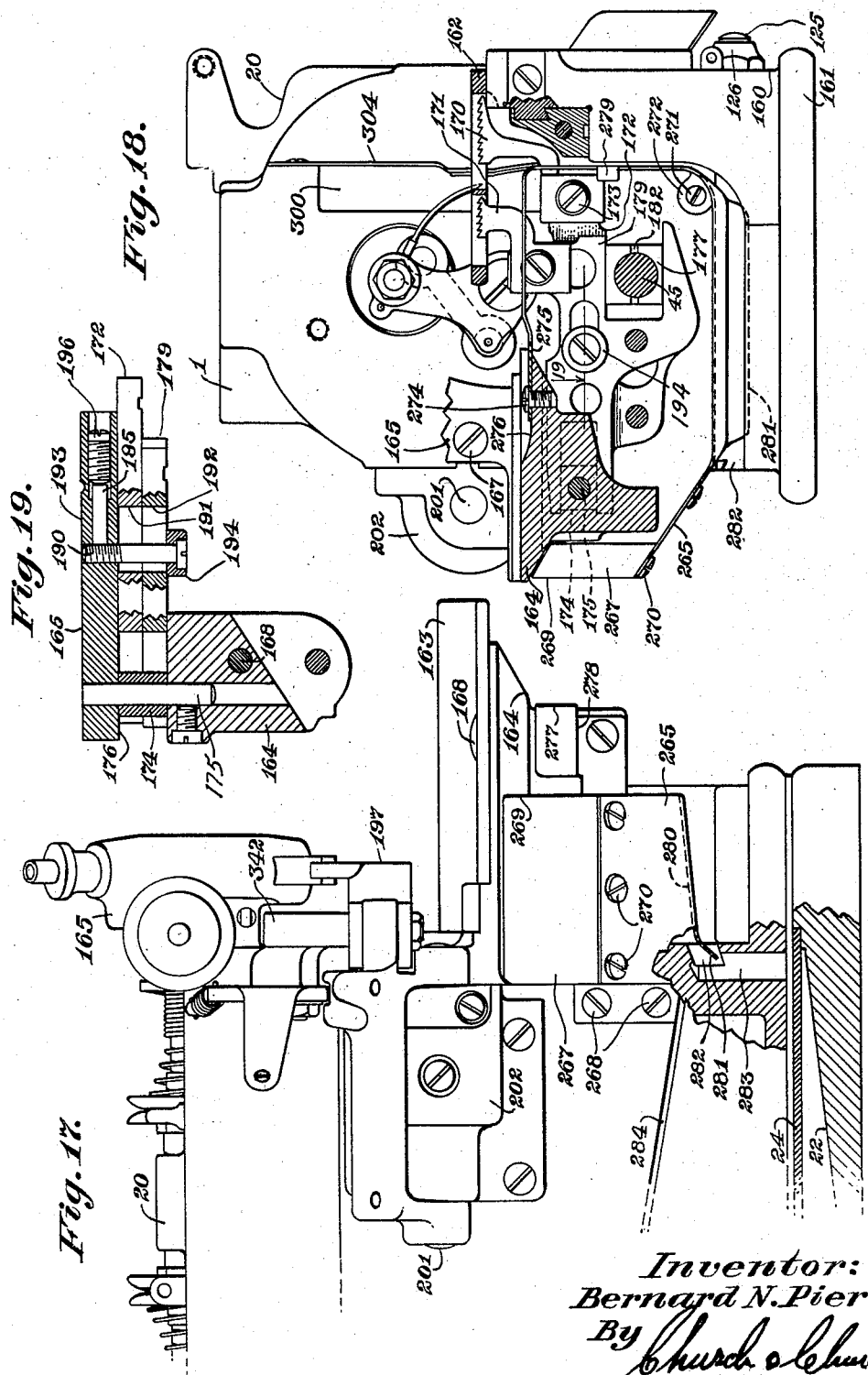

March 31, 1959     B. N. PIERCE     2,879,733
LUBRICATION SYSTEMS
Filed Nov. 21, 1951     13 Sheets-Sheet 12
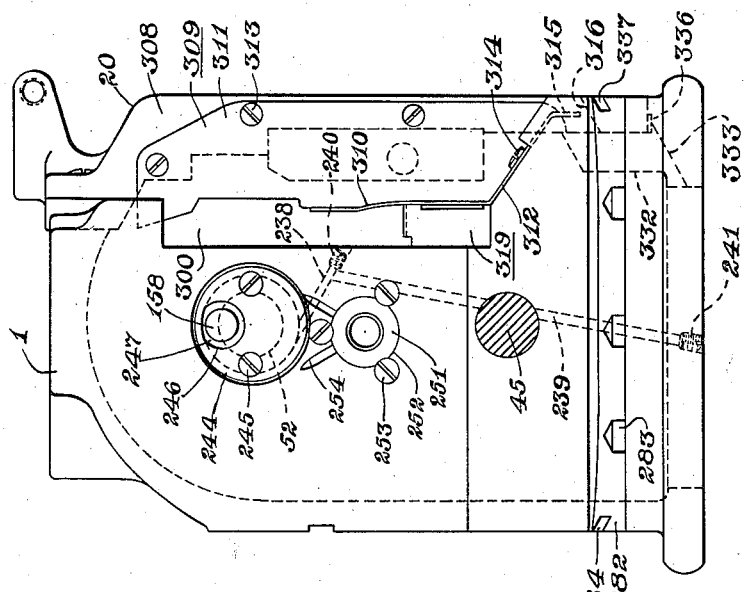
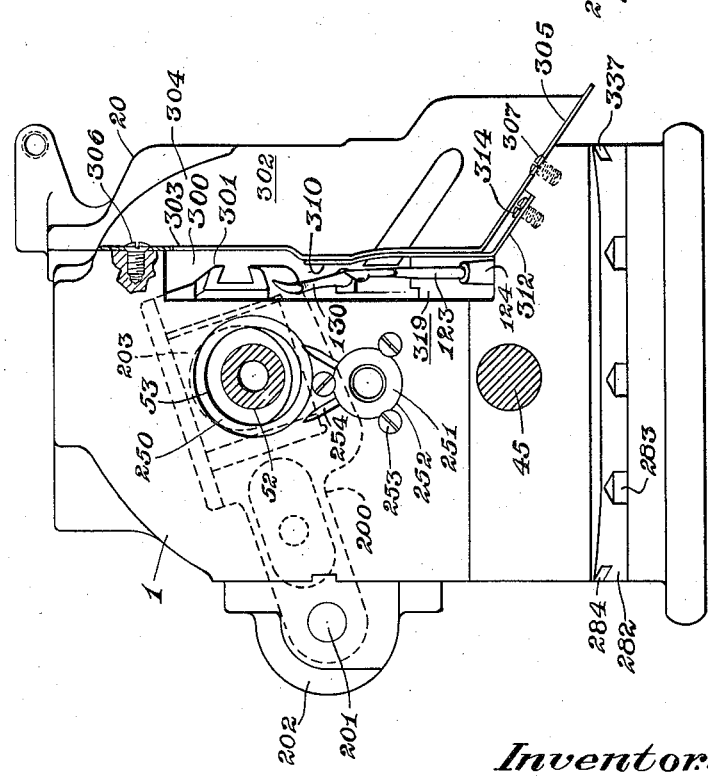
Inventor:
Bernard N. Pierce
By Church & Church
His Attorneys March 31, 1959  B. N. PIERCE  2,879,733
LUBRICATION SYSTEMS
Filed Nov. 21, 1951  13 Sheets-Sheet 13
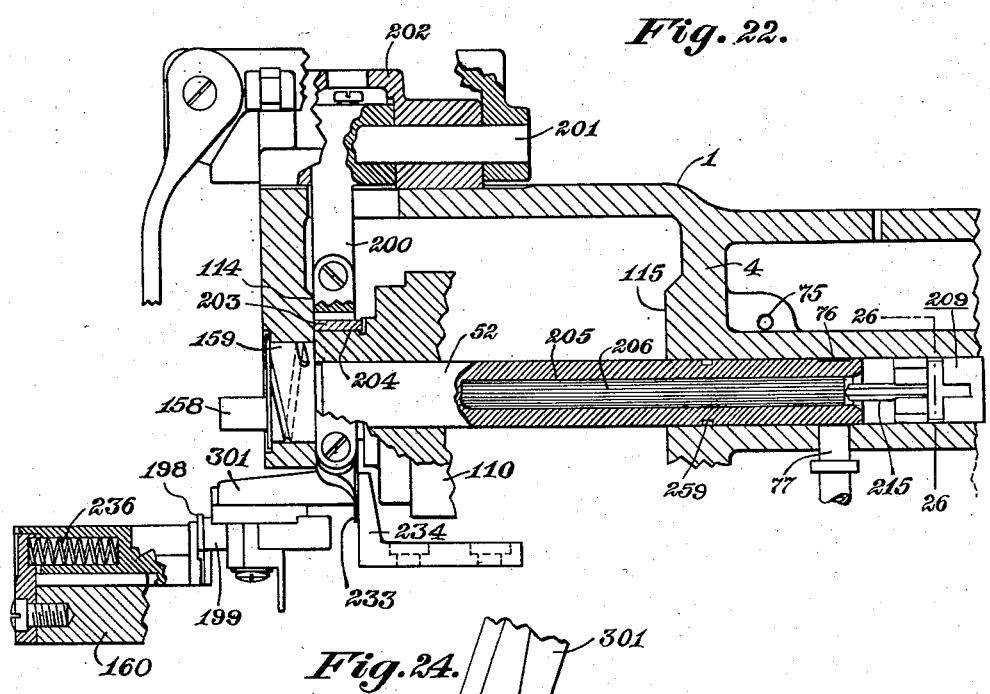
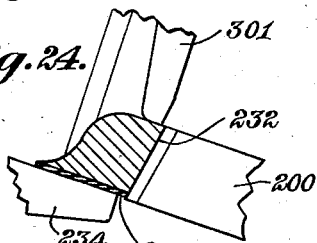
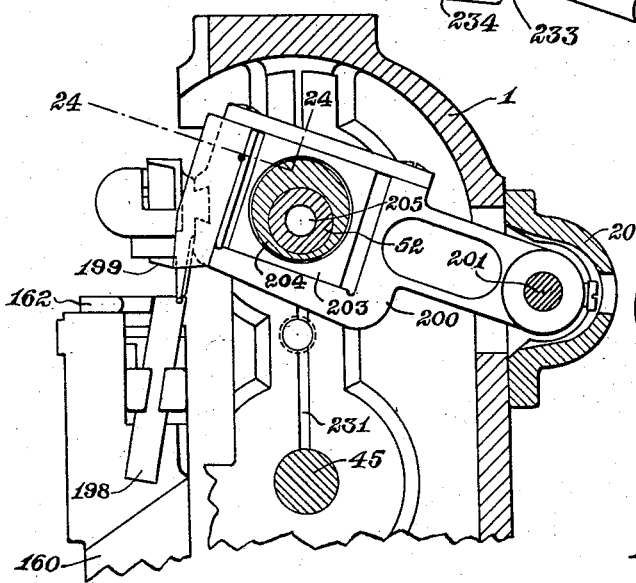
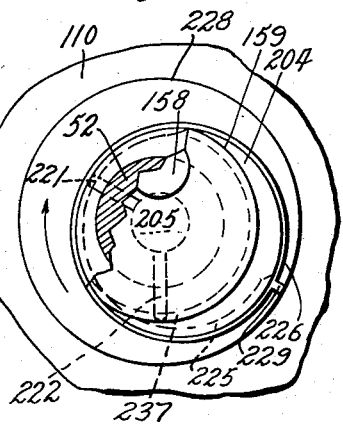
Inventor:
Bernard N. Pierce
By Church & Church
His Attorneys

United States Patent Office 2,879,733
Patented Mar. 31, 1959

2,879,733

LUBRICATION SYSTEMS

Bernard N. Pierce, West Hartford, Conn., assignor to The Merrow Machine Company, Hartford, Conn., a corporation of Connecticut Application November 21, 1951, Serial No. 257,620

107 Claims. (Cl. 112—256)

This invention relates to improvements in lubricating systems and particularly to the lubrication of precision bearings in high speed machinery.

In many types of modern machinery, precision bearings are employed extensively to facilitate operation at extremely high speeds. To protect these bearings it is vitally important that they be supplied with sufficient but not excessive lubrication and it is the primary object of the present invention to provide a lubricating system capable of insuring substantially continuous and accurate lubrication of precision machinery of the character indicated.

While certain aspects of the invention are appropriate for more general application, other features included are especially applicable, as illustrated in the accompanying drawings, to overedge sewing machines of the well-known "Merrow" type, distinguishing characteristics of which have been described at length in United States patents. Prominent among identifying features of this specific type of sewing machine are a curved eye-pointed needle, a lower or loop-taking looper and an upper looper, said loopers being actuated to cooperate with the needle and with each other by a pair of grooved cam cylinders geared together to rotate in unison, one cam cylinder being fast on a lower or main shaft provided with a combined drive pulley and hand wheel, and the other cam cylinder fast on a secondary shaft located above the main shaft. The machine also includes trimming mechanism and work feeding elements, the needle and trimming mechanism being actuated from the upper shaft while the feeding means is actuated from the lower or main shaft.

One major object of this invention is to insure the positive feeding of lubricant in adequate but not excessive quantities to all working parts of the machine. Another major object of the invention is to provide for the recovery of lubricant, the storage of recovered lubricant and the recirculation of the lubricant in a compact machine of substantially the same over-all dimensions as previously required for a machine with a conventional gravity-type lubricating system.

Among the more specific objects of the invention is the provision of indicators visible to the operator for showing the flow of oil into the lubricating system and for showing the level of oil in the reservoir. Another specific object of the invention is to provide for the distribution of certain quantities of lubricant through the bore of a shaft of the machine to lubricate parts remote from the reservoir and the pump. Still another specific object of the invention is to provide a lubricant pump of simplified construction for transferring lubricant under pressure from one part of the machine to another part, thereof.

In the attainment of these objects, one feature of the invention resides in the arrangement of a partition dividing the machine frame into a mechanism compartment and a reservoir compartment with a shallow sump at the bottom of the mechanism compartment. A circulating pump driven by a shaft extending through both compartments forces oil under pressure from the reservoir into a transparent dome on the top of the frame and also directly through the partition to parts of the machine in the mechanism compartment nearest the reservoir compartment. Disposed beneath the dome to receive oil therefrom is a chamber with a lubricant conductor for supplying oil into the bore of the same shaft which drives the pump. There is disposed within the shaft a rod having longitudinal ribs engaging the inner periphery of the bore and forming therewith several longitudinal lubricant directing ducts. Radial outlets in the shaft transfer lubricant from these ducts to certain parts of the machine in the mechanism compartment remote from the reservoir and through the wall of the mechanism compartment to parts of the machine outside thereof. Arrangement of the conductor in the chamber and with relation to the bore of the shaft is such that excess lubricant is returned to the reservoir and only an adequate quantity is supplied to the shaft. Also while most of the oil advanced by the circulation pump is directed through the transparent dome, a small portion is directed through a duct over the upper shaft to a dispersing arrangement comprising a portion of a peripheral groove and a spiral groove in the upper shaft to feed the remainder of the mechanism in the mechanism compartment.

Another important feature of the invention resides in the bottom closure of the frame whereby separate closure parts cover the bottoms of the mechanism compartment and the reservoir compartment so the mechanism compartment may be opened without draining oil from the reservoir. Thus, during minor repairs and adjustments in the mechanism compartment, it is unnecessary to drain oil from the machine.

Still another feature of the invention resides in an improved carrier for the upper looper. This carrier includes a rod arranged on the frame cap on which slides a sleeve carrying the looper carrier and having cam follower rolls for engagement in peripheral grooves on cam cylinders disposed in the mechanism compartment of the machine. On the frame cap, guides are arranged to engage the arms of the looper carrier and provide a definite path along which the sleeve and the looper carrier may reciprocate.

Still another specific feature of the machine is the improved pump which is simplified in that a portion of a shaft comprises a cam and is engaged by a spring pressed plunger. The bearing in which the shaft is journalled is entered toward the path of the cam by ducts respectively on opposite sides of the longitudinal axis of the plunger. Thus in effect, as the shaft rotates, a chamber is formed within the shaft bearing on opposite sides of the plunger. A further feature of the invention includes the provision of a scavenging pump connected to the sump for the purpose of drawing oil through a filter plate and depositing it in the upper portion of the reservoir compartment.

Other objects and features of the invention will hereinafter become apparent from the arrangement and combination of parts as fully set forth in the following detailed description of a preferred embodiment of the invention which is illustrated in the accompanying drawings while the novelty of the invention is defined in the accompanying claims.

In the drawings,

Fig. 2 is a front side elevation of the machine shown in Fig. 1.

Fig. 3 is a longitudinal vertical section in a plane extending through the main shaft of the machine with certain parts broken away and others omitted.

Fig. 7 is a front elevation partly in section of the machine frame with a frame cap omitted but showing elements of looper mechanism supported by the frame cap.

Fig. 8 is an inner face view of a frame cap showing stationary and movable elements supported thereby.

Fig. 9 is a transverse vertical section substantially on line 9—9 of Fig. 2, showing an upper looper carrier and cams for actuating the carrier.

Fig. 10 is a horizontal section substantially on line 10—10 of Fig. 3, through the machine frame mostly in the plane of the main shaft bearing.

Fig. 11 is a horizontal section substantially on line 11—11 of Fig. 2.

Fig. 12 is a left end view of the lower portion of the machine frame.

Fig. 13 is a section on line 13—13 of Fig. 11.

Fig. 14 is an inner face view of a frame cap and certain parts associated therewith.

Fig. 15 is a transverse vertical section on line 15 of Fig. 2.

Fig. 16 is a sectional detail view substantially on line 16—16 of Fig. 2 of a lower looper carrier and support therefor.

Fig. 17 is a rear view of the head end of the machine.

Fig. 18 is a view similar to Fig. 1 but with parts omitted, broken away or in section, to better disclose feeding means and enclosure therefor.

Fig. 19 is a horizontal section substantially on line 19—19 of Fig. 18 showing support for elements of feed mechanism.

Fig. 20 is a left end view of the machine frame showing aperture through which loopers and cutter carrier extend.

Fig. 21 is a view similar to Fig. 20 but with a closure element or dust shield removed.

Fig. 22 is a view partly in horizontal section substantially on line 22—22 of Fig. 15 showing upper shaft and trimming mechanism assembly.

Fig. 23 is a view showing elements of trimming mechanism.

Fig. 24 is a fragmentary detail view partly in section on line 24—24 of Fig. 23.

Fig. 29 is a detail view of a guide bar and associated parts including an oil deflector.

Fig. 30 is a detail view of the head end of the shaft shown in Fig. 5, showing also the eccentric mounted on the shaft adjacent its head end.

Figure 1:
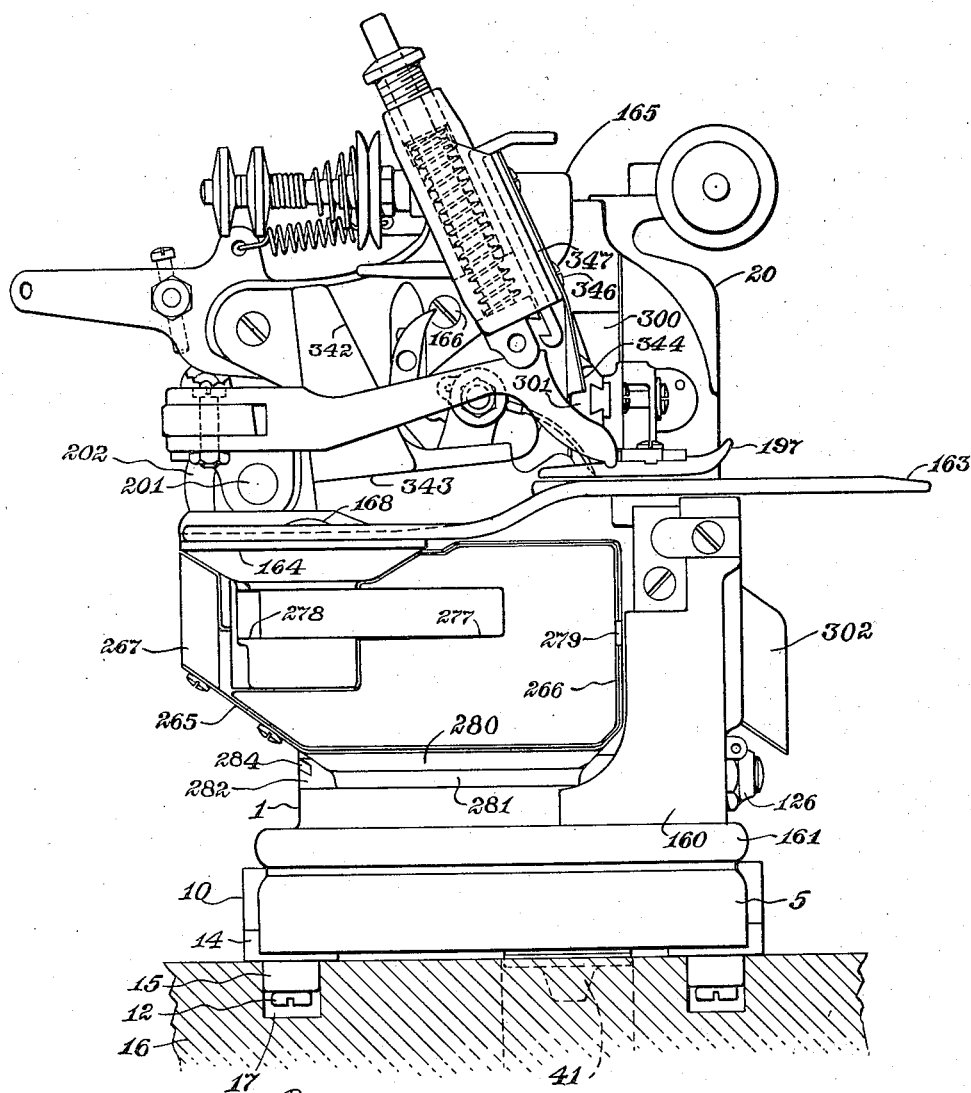
Fig. 1 is an elevation view of the left end of a sewing machine embodying my invention.

Referring to the drawings, the frame of the sewing machine illustrated, comprises a main casting 1, having a mechanism compartment 2 and an oil reservoir compartment 3 separated by a partition 4 extending between the front and back sides of the machine. Forming a base for the machine frame, are a plate 5 and a similar plate 6. For securing these plates to the frame, screws as 7 serve for plate 5 and screws 8 for plate 6. Means for supporting the machine upon a work table, include studs 9, respective studs being threaded into the frame 1 adjacent each bottom corner thereof. Each stud has an enlarged mid section 10, and a stem 11, with the latter terminating in a slightly enlarged head 12, slotted for application thereto of a screw driver for convenience in applying the stud to the frame. Head 12 also serves to hold on the stem 11 a sleeve 13 having a flange 14 and a terminal button 15 of reduced diameter. Such a sleeve, to provide a resiliently yieldable support for the machine, is preferably made of neoprene or a similar material. Because of its yieldable character such a sleeve is capable of being readily forced onto stem 11 over head 12. A table top as 16, prepared for support of a machine equipped with resilient sleeves such as just described has therein holes or counterbores 17 to receive respective buttons 15. With a machine supported as indicated by table top 16, the flange 14 of the respective sleeves 13 is interposed between horizontal surfaces of the table and machine to yieldably receive the weight of the machine, while lateral displacement of said machine is yieldably opposed by engagement of buttons 15 with side walls of counterbores or holes 17, with the result that these yieldable contacts effectively dampen the vibration reacting on the table when the machine is operated at extremely high speeds. The parts of larger diameter, respectively of studs 9 and sleeves 13, are partly enclosed in the clearance recesses as 18 in base plates 5 and 6.

It will be observed that base plate 5 forms a bottom closure for mechanism compartment 2 and also that an opening 19 in the front side of said compartment is closed by a frame cap 20, secured to the frame as by screws 21. Furthermore, for several mechanisms hereinafter to be described, compartment 2 provides a housing where considerable oil is discharged from both movable and stationary parts. To receive this drainage oil, base plate 5 is provided with a sump forming recess 22 which is slightly enlarged near its top to provide a shoulder 23 on which rests a filter plate 24 of porous metal or other suitable material. Bottom wall 25 of sump 22 is inclined downwardly toward a port 26, closed at one end by screw plug 27 and having an upwardly directed branch 28 communicating with a duct 29 in the partition 4, said duct forming the intake of a pump hereinafter described.

Base plate 6 forms a bottom closure for reservoir compartment 3. As occasional drainage and flush cleansing of an oil supply reservoir is desirable, means are provided in base plate 6 for conveniently attaining this purpose. Such means include a port 30 in base plate 6 which communicates with a lateral bore 32 having an itermediate enlarged section 33 and an outer threaded section 34. Engaged with threaded section 34 is a valve screw 35 having a pilot 36 to receive an elongated valve washer 37 of suitable slightly resilient material such as nylon. This washer is held on pilot 36 with a lock ring 38. Valve screw 35 is accessible with a screw driver from the front of the machine and when it is turned to engage the end of washer 37 with valve seat 39, an oil tight closure of the outlet duct is effected. Retraction of screw 35 first unseats the valve and may be continued to more or less uncover an outlet branch 40 to control the rate of discharge flow therethrough according to requirement. This outlet is preferably supplemented with a fitting 41 to provide a discharge spout. It will be noted that plates 5 and 6 are separately removable from the machine frame. This arrangement is advantageous in that plate 5 may be removed for cleaning or replacement of filter plate 24 without the necessity of releasing contents of oil reservoir compartment 3. To insure an oil tight closure, a gasket 42 is interposed between the bottom of the machine frame 1 and the opposing surface of plate 5. Similarly a gasket 43 is interposed between the machine frame and plate 6, and a gasket 44 between fitting 41 and plate 6.

A main or lower shaft 45 of the machine extends through mechanism compartment 2 and is supported in suitable bearings, as plain bearings 46 and 47, and needle bearing 48. Plain bearings 46 and 47 are respectively at the left side and right side of mechanism compartment 2, while needle bearing 48 is adjacent the right end of a housing 49 which extends from partition 4 through reservoir compartment 3. For driving shaft 45 a combined pulley and hand wheel 50 is secured thereto outside the machine frame in proximity to needle bearing 48.

Arranged to be driven from the lower shaft 45 is an upper shaft 52, extending through the mechanism compartment 2 and supported in plain bearing 53 at the left end of the machine frame and in upper bearing bore 55 at the right end. Upper bearing bore 55 at the right hand end of shaft 52 is extended entirely through the right end of the machine frame above reservoir compartment 3 and is closed with a screw plug 56 thereby forming a chamber 57 which is supplemented by another bore 58 thereabove which is fitted with a screw plug 59 to close the outer end of bore 58. Said upper and lower bores 55 and 58 have a communicating passage 60 therebetween. The entire chamber formed by these communicating bores serves a purpose that will presently appear.

Figure 4:
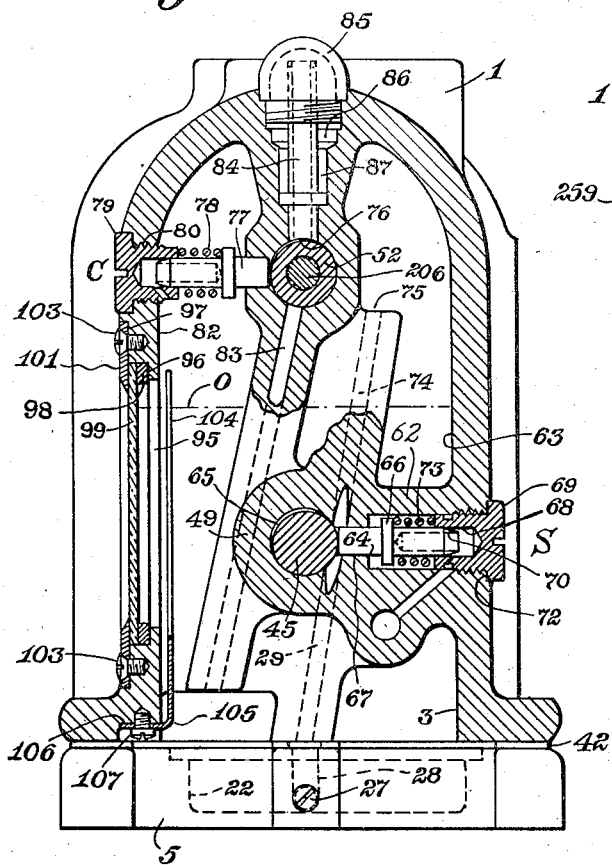
Fig. 4 is a section on line 4—4 of Fig. 3.

As clearly shown in Fig. 4 separate pump mechanisms as at S and C are shown as associated respectively with lower shaft 45 and upper shaft 52. The lower pump is enclosed in a housing 62 extended from shaft housing 49 to a rear wall 63 of reservoir compartment 3. The pump includes essentially a plunger or pin 64, transversely disposed to and with its inner end contiguous to the shaft 45, said shaft in a peripheral path thereon engaged by the pin, presenting a cam surface 65. To form a shoulder on pin 64, said pin is provided intermediate its length with an integral collar 66, and to reduce weight of the pin, it is preferably of tubular form at its outer end. Engaging pin 64, respectively at each end thereof, suitably to permit of its reciprocation, is the bore 67 in housing 62 adjacent shaft 45 and a similar bore 68 in a screw 69. Said screw engages the enlarged outer end of bore 67 and serves as a tight closure of the housing, and also as a simple arrangement permitting convenient assembly of the pump parts. Such assembly is further facilitated by forming on the outer end of pin 64 a slight bevel as at 70 which insures its definite entry into the screw bearing when the screw is applied previously to being seated against shoulder 72 thereon. For yieldably urging plunger or pin 64 into engagement with shaft or cam surface 65 to thereby form a seal across duct 29, above mentioned, a spring 73 is interposed between the end of screw 69 and the pin collar 66. Thus as shaft 45 rotates (in a clockwise direction as viewed in Fig. 4) plunger 64 is reciprocated but constantly forms a seal between duct 29 and a delivery duct 74 thereabove. While the low part of cam surface 65 is still partially within duct 29, plunger 64 is moving outwardly and causing a partial vacuum in said duct and in the chamber extended therefrom that is momentarily formed between the shaft bearing and said low portion of cam surface 65. This partial vacuum pulls a modicum of oil into the momentarily formed chamber indicated. This oil as the shaft rotates is then trapped in said chamber and subsequently delivered into duct 74 as a one-revolution cycle of the cam and the plunger action effected thereby is completed. Rapid repetition of this described cycle of action causes oil to be drawn from sump 22, forced into delivery duct 74, and finally discharged into oil reservoir 3 at an elevated port as at 75. This discharge port is located above the maximum oil level O ever acquired in the reservoir thereby preventing oil from draining back past the pump cam 65 into sump 22. It will be observed that eccentric or cam surface 65 extends outwardly at both ends to merge with the full shaft diameter and thus when the shaft rotates the cam moves in an orbit within the cylinder defined by the shaft bearing. Thus the shaft bearing, with the depression formed by the cam, provides a pump compression chamber, thereby keeping said chamber within space so limited as to avoid structure complication encountered as when the cam is of a diameter larger than journal extensions of the shaft at either side thereof.

The circulating pump at C is actuated by cam surface 76 on upper shaft 52 and is substantially a counterpart of the sump pump at S. It includes pin 77, spring 78 and a pin bearing screw 179, the latter forming a tight closure for threaded hole 80 in front wall 82 of reservoir compartment 3. Due to the fact that his circulating pump is above the maximum level ever attained by oil supply in the reservoir, housing for the intermediate section of pump pin 77 is omitted as unnecessary. Operation of this circulating pump by cam 76 on upper shaft 52, draws oil from near the bottom of the oil supply through duct 83, thence forces the oil through an upright tube 84 which terminates at its upper end within a transparent dome 85. Dome 85 is screwed into the machine frame thereby closing a bore 86. Tube 84 is supported in a reduced diameter portion 87 of the bore 86. Said bore at 87 above where it closely fits tube 84, is of a diameter considerably larger than the exterior of the tube and communicates with the above mentioned bore 58 (see Fig. 3). Thus circulating pump C, which functions continuously during operation of the machine, causes an oil flow which is conspicuously visible at the transparent dome 85, whence the oil descends through described passageways 86, 58 and 60 into chamber 57 for subsequent delivery through paths that lead to numerous areas where lubrication is needed, as will presently be described.

Means whereby the reservoir may be conveniently provided with an initial supply of oil, include the bore 60 where it is extended through from the top of the machine frame, and as has been already described, unites bores 57 and 58. Into the threaded entrance 88 of bore 60 is screwed a filling aperture forming bushing 89, internally threaded to receive a filler closure cap 90, having attached thereto by a chain 92, an anchor 93, of a shape that will not pass through bushing 89 but will permit passage of oil. This arrangement prevents loss of said cap when it is removed from bushing 89. Leading from chamber 57 is a drainage port 94 providing for escape of excess oil from said chamber to the reservoir below.

To provide visibility of the level O, of oil supply, a sight opening 95 is formed in the front wall 82 of reservoir compartment 3. This opening is recessed as at 96 and 97. Gasket 98 and a transparent panel 99 are held in recess 96 by an escutcheon plate 101 held in recess 97 by screws 103. This construction positively prevents oil leakage at the sight opening. A white reflector plate 104, opposed to sight opening 95, within the reservoir compartment 3, is angled at 105 to engage a recess seat 106 in frame 1, where the angle leg is held by screw 107.

Figure 6:
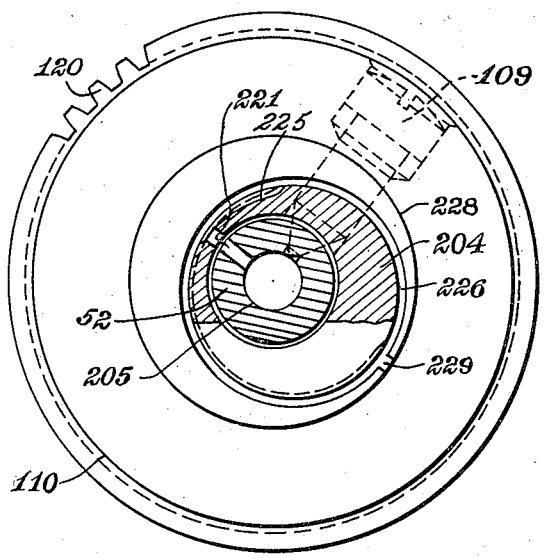
Fig. 6 is an enlarged end view of the cam partly shown in Fig. 5 with the shaft shown in section on line 6—6 of Fig. 5.

Within mechanism compartment 2, a cam cylinder 108 is secured to lower shaft 45 as by set screw 109 (see Fig. 9) and a second cam cylinder 110 is secured to the upper shaft 52 as by set screw 111 (see Fig. 6). End thrust bearing 112 on the left end of the frame and end thrust bearing 113 on partition 4 engage respective ends of cam cylinder 108 and prevent endwise movement thereof together with the lower shaft 45, while similarly end thrust bearings 114 and 115 engage respective ends of cam cylinder 110 and oppose endwise movement thereof together with upper shaft 52. Cylinder 108 is provided with cam grooves 116 and 117, and with gear teeth 118, while cam cylinder 110 is provided with cam groove 119 and gear teeth 120. The gear teeth of the two cams intermesh so that the cams rotate in unison, together with their supporting shafts to which they are respectively secured.

Figure 28:
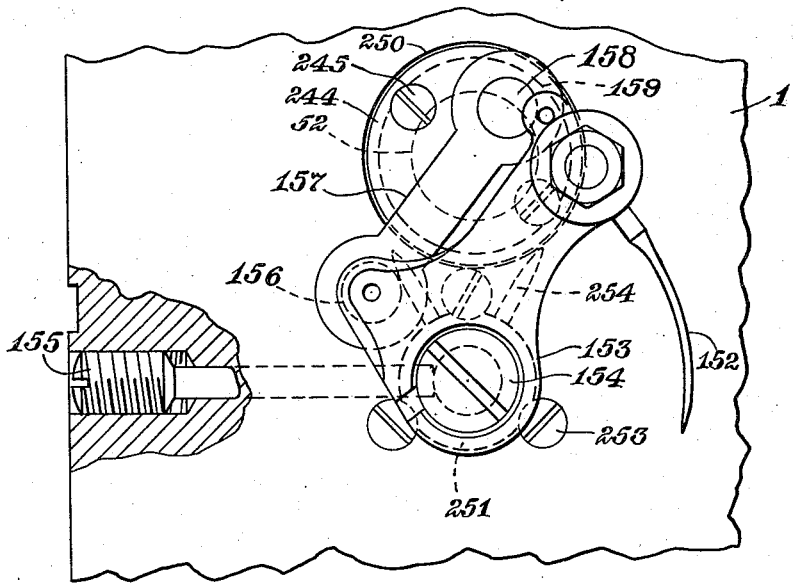
Fig. 28 is a detail view of a needle carrier and associated parts.

Lower and upper looper carriers are mounted on the inner face of the above mentioned frame cap 20. A lower looper 123 is required to move in an arcuate path and is therefore supported by a carrier 124 pivotally held on the frame cap as by a tapered stud 125, locked by a nut 126. A stud 127 on this carrier bears a roll 128, which engages cam groove 116. An upper looper 130 is required to move in an irregular path. Accordingly a carrier 131 for looper 130 is oscillated about an axis presented by an element that reciprocates in a rectilinear path. For this purpose carrier 131 includes a pair of oppositely extended arms 132 and 133 provided respectively with studs 134 and 135 which bear respectively rolls 136 and 137 for engagement respectively with cam grooves 117 and 119. For pivotally supporting carrier 131, it is provided with a hub 140 intermediate arms 132 and 133. This hub is pivotally supported on a stud 141 extended from a sleeve 142, mounted for reciprocation on a stationary rod 143 which is supported at both ends in a recessed block 144, secured to frame cap 20 by screws as 145. For guiding and maintaining accurate alignment of looper carrier 131 during movement imparted by the correlated cam grooves 117 and 119, widely separated rails 146 and 147 presented by block 144, engage one side of the looper carrier while opposed to said rails is a guide bar 148 in engagement with a looper carrier surface 149 defined by the end of looper carrier hub 140. Screws 150 and 151 secure guide bar 148 to the frame cap. From the foregoing description of looper actuating means it will be understood that loopers 123 and 130 are actuated in timed relation and in definite paths correlated to each other. These movements of the loopers are also correlated to movements of a curved eye-pointed needle 152 which is secured in a carrier 153, mounted on a taper stud 154 locked in the machine frame by set screw 155 indicated in Fig. 28. For actuating the needle carrier, a stud 156 thereon is connected by a link 157 to a similar stud 158 eccentrically disposed on the enlarged head or journal 159 of upper shaft 52 where the latter is supported in bearing 53.

Means for supporting, feeding and trimming material comprising the work will now be described. A standard 160 secured to the forward extension 161 of machine frame 1, provides support for a needle plate 162, and also for the forward end of work plate 163 which is further supported by a bracket 164 forming an integral part of a head 165 which is secured to left end of the machine frame by screws 166 and 167. A pivotal connection 168 is provided between bracket 164 and work plate 163 whereby the latter may be swung away from the needle plate and adjacent parts to render them conveniently accessible for inspection and adjustment. Below the needle plate, standard 160 affords support for the holder of a cutter included in trimming mechanism hereinafter to be described.

Feeding mechanism includes front and rear feed dogs as 170 and 171 respectively. The front feed dog is adjustably secured to a carrier 172 by a screw 173. To permit of endwise movement of the carrier, it is yoke-formed at its rear end for slidable support on a block 174 pivotally held on a pin 175 extended across a channel 176 in head 165. To impart vertical movement to the carrier 172, it is a yoke-formed at its front end to engage eccentric block 177 fitted on main shaft eccentric 178. A carrier 179 for rear feed dog 171 is similarly supported and has yoke formed rear and front ends which respectively engage block 174 and eccentric block 177. Block 177 is provided with notches 181 and 182 to vent oil flow through a spiral groove in the shaft eccentric engaged by the blocks as will hereinafter more fully be described. Differential eccentrics 183 and 184 keyed to main shaft 45 and held thereon by a nut 185, are engaged respectively by links 186 and 187 (see Fig. 10). Link 186 is pivotally connected to carrier 172 by a stud 188 and similarly link 187 is pivotally connected to carrier 179 by a stud 189. By this arrangement of eccentrics and link connections, feed dogs 170 and 171 are, upon rotation of shaft 45, actuated in movements characteristic of four-motion differential feed common in prior art.

Inasmuch as accurate alignment of feed dogs, and therefore the carriers, is of major importance, means are provided to insure maintenance throughout the length of the carriers of a parallel relationship normally defined by lateral confinement of said carriers in channel 176 mentioned above. Effective for this purpose are means applied at areas remote from channel 176 for applying to the carriers lateral confinement similar to that afforded by said channel. Thus a screw 190 is extended through elongated apertures 191 and 192 respectively in carriers 172 and 179, and threaded into shank 193 of head 165, with a collar 194 engaged by the head of the screw for lateral bearing engagement with the outer carrier 179. By adjustment of screw 190, the bearing surface of collar 194 may be suitably located with respect to the opposed bearing surface engaged by carrier 172, and provision for maintenance of this relationship effective for accurate guidance of carriers 172 and 179, comprises a pin 195, and a set screw 196 for urging the pin into locking engagement with the threaded end of screw 190. Feed dog actuating means substantially like the arrangement of mechanism just described but without the stabilizing application thereto of collar 194 and parts associated therewith, has been explained more in detail in United States Patent No. 1,070,818, granted September 2, 1913, upon application of William H. Stedman.

Cooperative with feed dogs 170 and 171 is the usual presser foot 197, together with associated mechanism which need not here be described in detail.

The trimming mechanism illustrated includes a lower, normally stationary cutter 198, and an upper movable cutter 199. A carrier 200 for upper cutter 199 is mounted for oscillatory movement upon shaft 201, within housing 202, which supports said shaft at the rear of machine frame 1. Intermediate its ends, the carrier 200 is provided with a capped opening to receive an eccentric engaging block 203, the eccentric 204 therefor being integral with the upper cam cylinder 110, from which it will be clear that an oscillatory motion effecting trimming action of the cutters is imparted to the carrier when the cam is rotated.

Figure 25:
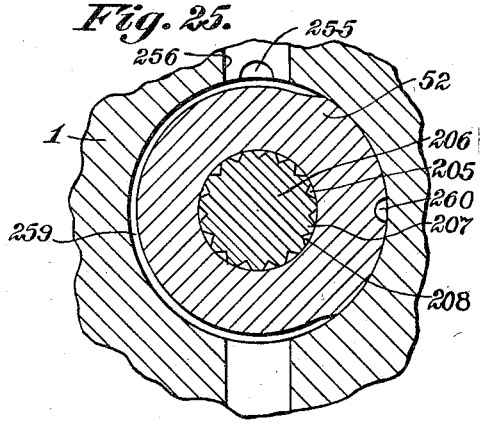
Fig. 25 is a section on line 25—25 of Fig. 3.
Figure 26:
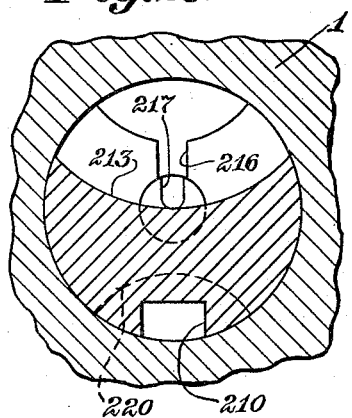
Fig. 26 is a section on line 26—26 of Fig. 22.
Figure 27:
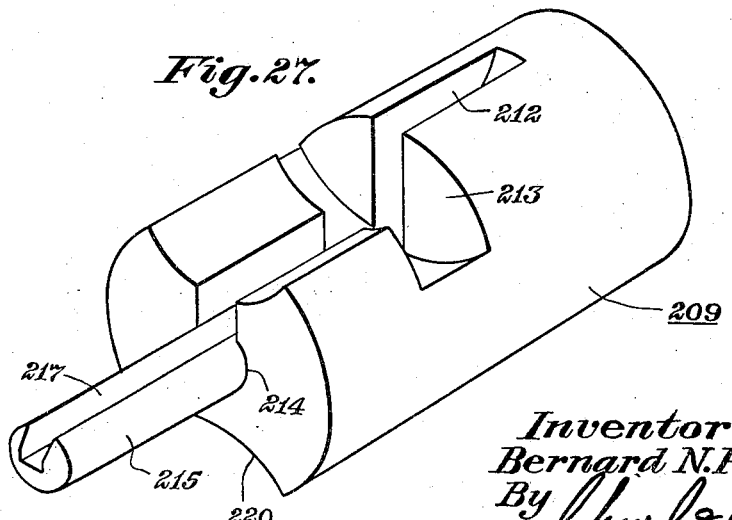
Fig. 27 is a perspective detail view of an oil conductor.

Referring again to upper shaft 52, means associated therewith will now be explained whereby oil is delivered in controlled amount to various points from whence it flows or is impelled to areas to be lubricated. Extended longitudinally of shaft 52 is a bore 205, open at the right end of the shaft and terminating within shaft head 159. Within this bore 205 is a rod 206 of a diameter to provide for convenient assembly of the rod within the shaft. For a purpose that will presently appear, rod 206 has on its periphery a series of longitudinal ribs 207 extending throughout the length of the rod. Preferably there are about fifteen ribs forming longitudinally extending serrations or grooves 208 of relatively slight depth (see Fig. 25). Ribs 207 engage the inner periphery of shaft bore 205 so that serrations 208 form a series of longitudinally extending lubricant directing ducts. One end of rod 206 is contiguous to the closed end of shaft bore 205, while the right end of the rod is spaced inwardly from the corresponding end of the shaft so that shaft bore 205 constitutes a recess to receive the spout of an oil conductor or feeder element 209.

This oil conductor element may be conveniently made from a comparatively short cylindrical rod of a diameter to endwise movably fit within bearing bore 55 where said bore is extended beyond the end of shaft 52 to form chamber 57. To prevent rotation of this feeder element it is formed with a keyway 210 for engagement with a key such as the head of a screw 211 threaded into the machine frame. The upper side of the feeder element is provided with a trough forming groove 212 and an intermediate intersecting deeper groove forming a pocket 213. Communicating with pocket 213 is a bore 214 for the reception of a rod 215 which is longitudinally grooved to match a longitudinal channel 216 in the feeder element to thereby form a trough 217 leading from pocket 213 to the end of rod 206.

The end of feeder element 209 adjacent screw 56 is recessed and threaded (see Fig. 3) to receive and hold a spring 218 which is freely received and kept in alignment by engagement with a recess 219 in screw 56. The purpose of spring 218 is to exert endwise pressure on the feeder element 209 to maintain light contact of rod or spout 215 with the end of serrated rod 206, thus also serving to keep the serrated rod located endwise relative to the shaft or in other words with the rod in end engagement with the closed end of bore 205. Due to the fact that spring 218 is anchored to feeder element 209, it remains with said feeder element when screw 56 is removed but as the screw is removed the spring so elongates that it may be conveniently grasped for removing the spring, together with feeder element and spout assembly. The end of rod or spout 215 is slightly pointed to engage the center of the end of rod 206. Thus the trough formed in rod 215 is positioned to deliver oil at the center of serrated rod 206. Beneath spout 215, feeder element 209 is relieved at 220 to permit passage of excess oil through the duct or drainage port 94 above mentioned. With the machine in operation oil is delivered copiously into passage 60, thence flows over feeder element 209 into pocket 213, and thence through channel or trough 217 to the end of rod 215 where the oil is brought definitely into contact with the end of serrated rod 206. Oil adhering to the end of the rod is driven radially by centrifugal force, enters rod serrations 208 and is thereby directed throughout the length of the rod. Oil in excess of the amount received by serrations in rod 215 is diverted from chamber 57 and returned to the reservoir as before mentioned.

Figure 31:
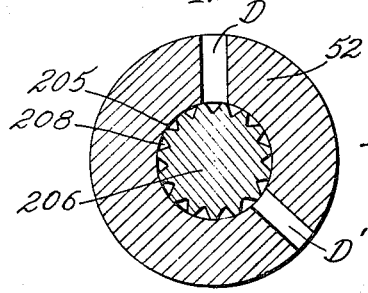
Fig. 31 is a transverse sectional view of a hollow shaft and a serrated rod therewith.

At suitable points along shaft bore 205, transverse ducts extend through the surface of the shaft as at 221, 222 and 223. Each of these ducts or radial outlets from bore 205 is constantly in communication with one or more different grooves 208 in rod 206. For example, a duct as D may extend over but one of the grooves 208, while a duct as D' extends over two of said grooves (see Fig. 31). Duct 221 extends radially through eccentric 204 (above mentioned as forming an integral part of upper cam cylinder 110) into a helical groove 225 in the periphery of said eccentric, the function of the eccentric being, as already stated, to actuate elements of the trimming mechanism. This helical groove extends substantially two-thirds of the way around the circumference of the eccentric, with one end of the groove terminating substantially at the intersection thereof with duct 221, and the other end merging with a circumferential clearance groove 226 formed in the periphery of eccentric 204 and in an end surface 227 normal to said periphery, said end surface comprising the termination of a hub 228 on cam 110. Substantially at the juncture of helical groove 225 and circumferential groove 226, an outlet channel 229 is provided in hub 228, while at the opposite end of eccentric 204, helical groove 225 terminates adjacent shaft head 159. As shaft 52 rotates (see Fig. 6), oil from bore 205 is centrifugally driven through duct 221 into helical groove 225, thence impelled by the groove into clearance groove 226, and finally discharged from groove 226 through outlet channel 229. Thus free passage of oil through duct 221 of shaft 52, and control of its subsequent flow by helical groove 225, provides for suitable lubrication of all bearing surfaces contiguous to the trimming mechanism eccentric block 203 above mentioned.

Excess oil from shaft head bearing 53 lubricates thrust bearing 114 where it engages the exposed face of eccentric 204 on the left end of upper cam 110. For directing passage of excess oil from shaft head bearing 53 and from thrust bearing 114 to the surface of thrust bearing 112 a channel 231 is provided in the machine frame between bearings 53 and 46. Thus, excess oil from the shaft head bearing 53 passes downwardly through channel 231 to the thrust bearing 112 which engages the left end of lower cam 108. Oil passing from these surfaces onto upper cutter carrier 200 is driven, by centrifugal action, to the free end of the carrier and directed by an angled surface 232 of said carrier onto a thin steel plate or fin 233 suitably secured to the extreme end of the carrier. This plate presents a bearing surface for engagement with a guide block 234 secured to frame cap 20 as by screws 235, the purpose of this block being to maintain the cutter carrier 200 in a plane normal to the axis about which the cutter carrier oscillates, and, therefore, free of cramping effect due to the thrust of the lower cutter 198 against the upper cutter 199 under the effect of spring 236. Plate 233 serves the further purpose of confining, well within mechanism compartment 2, such oil as may be discharged from the outer and lower edges of said plate after passing thereonto from cutter carrier 200, as above described.

From duct 222, oil passes into a helical groove 237 in the periphery of shaft head or journal 159, and is distributed by the groove along the shaft head bearing 53. For conducting some of the oil received by groove 237, to lower or main shaft bearing 46, ducts 238 and 239 are provided (see Fig. 21). The outer extremities of said ducts are closed respectively by screws 240 and 241. Duct 238 communicates with groove 237, and duct 239 intersects shaft bearing 46 (see Figs. 3 and 21). A helical groove 242 on shaft 45 distributes oil received from duct 239 along bearing 46, and a helical groove 243 in an eccentric portion of shaft 45 distributes oil to feed mechanism above described. From duct 223, which extends outwardly at an angle to the axis of shaft bore 205, oil passes to bearing surface of eccentric stud 158 to lubricate the engaging surface thereof with link 157, above described as included in needle carrier actuating means.

Figure 5:
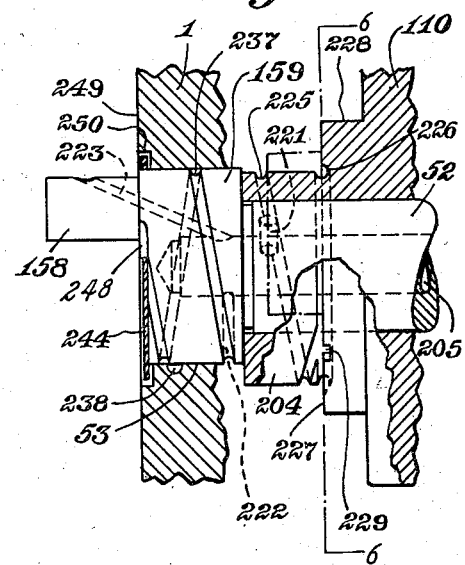
Fig. 5 is an enlarged detail view of part of an upper shaft and also shows part of a cam secured to the shaft.

During rotation of upper shaft 52, varying lateral pressure of shaft head 159 against its peripheral bearing surface tends to cause oil in this bearing to spurt outwardly from the machine frame. To divert such spurting of oil from areas where it would be objectionable, a flange on head 159 is effective. As shown such a flange is provided by a thin disk 244 secured to head 159 by screws 245. Extended through and slightly beyond an aperture 246 in disk 244 is a base portion 247 of stud 158, said base portion being of a larger diameter than the stud to provide a shoulder 248 (Fig. 5) for engagement by link 157. Machine frame surface 249 has formed therein a recess 250 to house flange forming disk 244, with the outer surface of the disk slightly within the recess. Oil escaping from the lower part of recess 250 flows down the machine frame surface 249 and serves to lubricate the pivotal support and end thrust bearing surface for needle carrier 153. Such a surface is preferably presented by a steel disk 251 inlaid in a recess 252 formed in the frame casting at the base of needle carrier supporting stud 154, where the disk is engaged by the end of the hub of said needle carrier. Suitable screws as 253 secure the disk in place with required precision. Radial grooves as 254 in the frame casting are inclined toward the bearing surface of the disk from thereabove for the purpose of directing to the needle carrier pivotal support and thrust bearing, oil discharged from recess 250.

To supply oil for each of the grooves in the lower cam and the groove in the upper cam, circulating pump C forces oil through an oil duct 255 from adjacent the base of tube 84 along the top side of shaft 52 to a bore 256 extending vertically through partition 4 of the machine frame and intersecting shaft bearings 55 and 47. Thus while the circulating pump forces oil through upright tube 84, it also forces oil along duct 255 into bore 256. The upper end of bore 256 is closed by screw 257 while the lower end terminates at the upper side of the lower shaft 45 in bearing 47 where it is intersected by a duct 258 leading to thrust bearing surface 113 of lower cam 108.

In the plane within which bore 256 intersects shaft bore 55, shaft 52 is provided with a groove 259 extending part way around the shaft periphery. Between the ends of this groove 259 a spiral groove 260 extends part way around the shaft periphery and crosses the plane of thrust bearing surface 115 at the right end of cam 110. On each revolution of shaft 52, groove 259 removes from the upper portion of bore or duct 256 a measured quantity of oil and delivers it into the portion of the duct 256 which is disposed below the shaft. This measured quantity of oil then gravitates to duct 258 and is carried thereby to thrust bearing surface 113 for the right end of lower cam 108. Similarly spiral groove 260 receives a certain amount of oil at each revolution of the shaft and directs it into end thrust surface 115 in upper cam 110.

From the film of oil thus provided for respective end thrust bearings 113 and 115 a selected amount is diverted to lubricate cam grooves 116, 117 and 119, and also bearing studs for cam rolls operative in these grooves. For conducting oil to the groove 116 in cam 108, a duct 261 extends from the end of the cam adjacent surface 113 to beneath said groove and thence into the groove through a port 262. From the receiving end of duct 261 toward port 262 the axis of the duct is divergent to the rotational axis of the cam, and port 262 is so located relative to the bottom of the groove 116 as to deliver oil also onto stud 127 which bears roll 128. Thus as cam 108 rotates, the opening of duct 261 adjacent bearing surface 113 collects from the oil film thereon an amount sufficient to be impelled by centrifugal force to and through port 262, thereby lubricating the groove and the stud 127. Similarly through divergent ducts 263 and 264 oil is delivered respectively to cam grooves 117 and 119 and the respective cam rolls therein.

Oil escaping from the inner end of bearing 46 obviously passes into sump 22 below mechanism compartment 2, while oil escaping from the outer end of said bearing spreads throughout parts comprising the feed mechanism and provides for their adequate lubrication as already indicated. Means are provided for preventing oil accumulated on this feed mechanism from being discharged upon areas where it would be objectionable. For this purpose a guard preferably of sheet metal is arranged to substantially enclose the parts involved. This guard together with the frame and head castings forms a compartment of which the rear wall is formed by the front end of frame 1, side walls, partly by bracket 164 of head casting 165 together with a part 265 of folded sheet metal, and a front wall comprising a sheet metal door 266. The side wall forming sheet metal part or guard 265 is supported at one side by a bracket 267, held on machine frame 1, by screws 268, an arm 269 of said bracket being closely adjacent head bracket 164, at the rear of the feed mechanism. Guard 265 is secured to arm 269 by screws as 270, to the machine frame by a screw 271 engaging angled ear 272, and to bracket 164 by a screw 274 which engages a tongue 275 of guard 265 in a recess 276, formed below a surface of said bracket that is engaged by work plate 163. The compartment front wall or door 266 comprises a flat plate of a contour to fit the irregular shaped opening of the compartment, and is secured to an arm 277. This arm is supported in a channel 278 formed in head bracket 164, and is pivotally held therein by the stud 168, about which work plate 163 is also movable as above described. By virtue of the pivotal mounting of its supporting arm 277, door 266 may be swung to either open or closed position. In closed position the door engages a suitable stop as a lug 279 angularly bent from guard element 265, while with the door in open relation the feed mechanism is conveniently exposed for inspection and such adjustments thereof as may be required. Disposal of oil discharged from the feed mechanism upon the described guard walls provided thereabout is arranged for by downwardly inclining the bottom wall 280 of guard member 265 toward the left end wall of the machine frame, and by further deflecting a lip 281 of the bottom wall into an oil receiving channel or drain pocket 282 formed in said end wall. Finally ducts 283 communicate with this drain pocket and lead into sump 22. Referring to Figs. 11 and 12, it will be noted that channel 282 extends entirely across the left end of machine frame 1 and that the bottom of the channel inclines downwardly from both ends and transversely into communication with ducts 283.

Sufficient oil discharged from moving elements in the mechanism compartment 2, passes into housing 202 to provide for lubrication of the bearings of shaft 201. Some of the oil is likely to pass to the outer side of housing 202 and thence to adjacent surface of machine frame 1. To divert this oil from areas where it would be harmful there is a channel 284 extended obliquely across the machine frame beneath housing 202. Cut transversely at an angle to form a trough, this channel at its lower end communicates with the similar channel 282 already described as having an eventual outlet into sump 22. Thus provision is made for harmless disposal of oil reaching the exterior of the machine frame in proximity to housing 202.

Within mechanism compartment 2, oil supplied to the rotating cams 108 and 110 is centrifugally discharged and a considerable amount of it is directed toward the inner face of frame cap 20. Thus the described movable parts associated with the frame cap are amply lubricated. It is, however, desirable that deposit and accumulation of excessive oil upon certain areas in proximity to the frame cap be prevented, and means are provided for this purpose. One area where an accumulation of oil would occasionally or periodically discharge in excessive amount is upon the ledge defined by the upper horizontal surface of block 144, above described as associated with the assembly including upper looper 130 and its carrier 131. This surface is therefore provided with a trough or channel 286 intersected by a transverse channel 287 directed to drain oil into a communicating channel 288 extended through the surface of the block that is next to the frame cap. From channel 288 oil discharges into frame cap groove 289, thence onto inclined surface 290 of the machine frame and finally into sump 22. Specifically this arrangement prevents spread of oil from the source indicated to the upper looper 130 and to areas adjacent the mechanism compartment opening through which the looper operates.

The juncture of frame cap 20 with the opening 19 therefor, in machine frame 1 is approximately coincident with the plane of rotation of the ends of cams 108 and 110 where they are provided with gear teeth. To prevent oil discharged substantially in this plane from impinging against the indicated juncture, with possible subsequent seepage of oil therethrough to the front of the machine, a guard 291 is provided. It is preferably made of sheet metal folded into trough-like form and is secured by screws as 292 adjacent to the appropriate edge of frame cap 20, as shown. One side wall 293 of guard 291, extends to one side of the gear teeth and into the space between the end surface of the cams and the adjacent wall of machine frame 1, with the free edge of this guard wall in proximity to end thrust bearings 113 and 115. At its upper and lower extremities, the bottom wall 294 of guard 291 is angled inwardly to better receive oil discharged thereupon from the gears, such discharge being preponderantly from the edge of the gears adjacent the plane of the surface of the thrust bearings 113 and 115. The other side wall of guard 291, at its mid section abuts block 144, while above and below this section it extends toward the periphery of respective gears. Oil expelled into this trough-like guard 291 is obviously discharged into sump 22.

As explained above the lubrication system herein set forth includes delivery of oil to cam grooves 116, 117 and 119. This delivery, to furnish adequate lubrication of the cam grooves and the elements engaged thereby, must be practically constant to those areas which move at the rate of speed that causes the oil thereon to be rapidly discharged centrifugally. Too general disposal of this oil throughout the mechanism compartment 2, would be conducive to escape of oil in objectionable amount through apertures required for the accommodation of moving elements included in trimming, looper, and takeup mechanisms. Certain guards or baffles in addition to those already described are therefore provided to direct oil spray away from said apertures and into sump 22. One such guard 295 is secured to the rear wall of mechanism compartment 2. This guard also is preferably made of sheet metal folded into desired form. As shown it comprises a substantially flat portion 296 and an upturned flange 297, the latter having holes therein for screws as 298 which secure the guard to the rear wall of the machine frame. Guard 295 adjacent the base of flange 297 is depressed to form a trough 299 which is suitably angled to serve as a drain for directing oil received from flat portion 296, toward the rear of the machine into sump 22, said flat portion 296 being somewhat inclined from the horizontal downwardly toward the trough. The perimeter of said flat portion except at its edge adjacent gears 118 and 120 closely follows the inner edge of guide bar 148 and the inner wall of mechanism compartment 2. From the foregoing statements it will be understood that oil discharged from grooves in the lower cam 108 impinges upon the under surface of the guard and instead of being thrown excessively upon elements of the trimming mechanism is confined to the lower region of the mechanism compartment and finally disposed of in sump 22. Furthermore oil discharged from the groove in upper cam 110 is received upon the upper surface of the guard and thence drained into sump 22 as indicated above.

As clearly shown in Figs. 20 and 21, the machine frame is provided with an aperture 300, through which extend from mechanism compartment 2, looper elements 123 and 130, and cutter carrier arm 301. Between this aperture and the adjacent end of frame cap 20, is a conveniently removable closure 302 formed of thin sheet material and comprising vertical walls 303 and 304 and an inclined bottom wall 305. Vertical wall 303 is opposed to aperture 300 and is secured to the machine frame by a screw 306 while bottom wall 305 is secured to the machine frame by a screw 307, thus holding the closure in place with vertical wall 304 thereof contiguous to the edge 308 of frame cap 20. To prevent oil from being thrown upon certain inner surfaces of closure 302, an oil guard 309 is provided, as otherwise oil from said surfaces would tend to seep through joints formed respectively by the closure with the machine frame and by the closure with the frame cap, and thence spread upon the front of the machine frame in objectionable amount. Guard 309, presenting rear wall 310, side wall 311, and bottom wall 312, conforms substantially with the configuration of closure 302, and is secured to the frame cap edge by screws as 313, and to the machine frame by screw 314. The joint established by screws 313, between frame cap 20 and guard 309 is oil tight and is in a plane slightly removed from the plane of contact between closure 302 and frame cap edge 308. Similarly the joint established by screw 314, between guard 309 and the machine frame, is in a plane slightly below the one in contact with the bottom wall 305 of closure 302. Also the bottom wall 312 of guard 309 extends short of the outer surface of the frame cap and terminates in a depending lip 315 which is directed toward a transverse surface 316 of the frame cap, said surface being so inclined as to divert oil received thereupon into the mechanism compartment 2 and thence to the sump therebelow.

It is to be understood that closure 302 forms a desirable guard closely adjacent elements of the above described trimming mechanism, and that the bottom inclined wall 305 of the closure which projects somewhat to the front of the machine frame, serves as a chute for passage of clippings from the trimming cutters. It is also to be understood that characteristics permitting convenient removal of closure 302 are highly desirable, inasmuch as such removal provides accessibility to facilitate adjustment of the lower looper 123. Said looper is secured in its carrier by a set screw 317, which is, with closure 302 removed, accessible through a hole 318 in oil guard 309, see Fig. 14.

It is important that lower looper 123 and its supporting arm be protected from excessive accumulation thereon of oil thrown from adjacent moving parts within mechanism compartment 2. For this purpose a shield 319 is provided. As shown (see Figs. 14, 20 and 21) such a shield comprises a suitable piece of thin material bent to form a top wall 320, side wall 321, and a supporting flange 322. Said flange may be attached to vertical wall 310 of guard 309 in any suitable manner as by soldering. In this position the top and side walls of shield 319 are effective to deflect harmlessly, oil that would otherwise pass onto the looper and its supporting arm.

Mounted upon lower looper carrier 124 is a takeup arm 323 which extends through a slot 324 in frame cap 20 (see Fig. 16). To prevent escape of oil through this opening and also to divert oil from certain moving parts, an oil collector 325 formed of thin material, is secured by screws as 326 to frame cap 20. This oil collector presents a base 327 for engagement with the frame cap, an intermediate wall 328, and an upstanding wall 329. The intermediate wall 328 together with an extension 330 thereof which lies beneath takeup arm 323, is so inclined as to direct oil accumulated thereupon toward the inner face of the frame cap, adjacent which, said wall of the collector is perforated, as at 331, to provide for discharge of oil accumulating at this region. The upstanding wall 329 of the oil collector is so located as to be traversed by upper looper arm 132. Thus such oil as may be continuously directed in small amount to the extremity of said arm is transferred to oil collector wall 329 and directed off harmlessly instead of being thrown objectionably elsewhere.

Referring to Figs. 9 and 11, it will be seen that frame cap 20 adjacent its lower edge is backed by a rib 332 of the machine frame. This rib is apertured at 333 to clear the hub of lower looper carrier 124 (see Fig. 16), the bottom of the aperture being so inclined as to direct oil deposited thereupon into sump 22. Rib 332 forms the rear wall 334 of a recess within which the lower portion of frame cap 20 is fitted, and along the lower wall 335 of this recess, adjacent the rear wall 334, is formed a channel or groove 336, the purpose of which is to accumulate such oil as may seep through the joint between the inner wall of the frame cap and wall 334 of rib 332, and direct the oil thus accumulated into aperture 333. This arrangement reduces to a harmless minimum the amount of oil tending to escape to the front of the machine frame at the base of the frame cap.

Adjacent to where closure element 302 is secured to machine frame 1 by screw 307 (see Figs. 2, 11 and 20) an arrangement occurs presenting opposing surfaces, between which, oil may escape to the front surface of the machine frame. Therefore, in close proximity to the indicated area of opposing surfaces and formed in the machine frame therebelow, is an inclined channel 337 leading into oil disposal channel 282 above described.

Referring to Figs. 8 and 9 it will be seen that oil discharged from the lower cam grooves is directed in considerable amount toward moving parts of the upper looper mechanism. To guard against drenching these parts with too much oil, a deflector 338 secured to guide bar 148 by screws as 339 serves effectively. Such oil as may gather upon the guide bar foot where it receives screw 150 is induced to flow into a frame cap drain channel 340 by the inclined bottom edge 341 of said foot, and the adjacent similarly inclined surface of block 144 (see Figs. 8 and 14).

In proximity to the needle carrier 153 and moving elements associated therewith, front and rear guards are provided to intercept oil, should it, under certain conditions, so accumulate as to be thrown off by said elements when they are moving at high speed. Thus at the rear of the area indicated a transversely L-shaped shield 342 is extended from a commonly employed fabric guard as 343 and at the front of the area a guard 344 is extended from a shank portion 345 secured by screws as 346 which also hold a cap plate 347 in place on head 165.

In operation, reservoir compartment 3 is supplied with oil to a suitable level through filling aperture formed by bushing 89. When power is applied to shaft 45 through pulley 50, shafts 45 and 52 are rotated in unison and rotate cams 108 and 110 in mechanism compartment 2. Rotation of upper shaft 52 operates circulating pump C to draw oil through duct 83 and force it upwardly through duct 84 into transparent dome 85 from which the oil gravitates into the chamber formed by bores 57 and 58. As the oil descends through bore 58, it is collected in pocket 213 of the lubricant conductor 209 and transmitted along channel 216 to trough 217 in spout 215 which is held in engagement with the exposed end of rod 206 within the recess formed by the bore in right end of the shaft 52. Lubricant is conducted from the trough 217 to the center of the exposed end of the rod 206 from which point it is transmitted by centrifugal force to the longitudinally extending ducts formed by ribs on rod 206 and the internal periphery of the bore in shaft 52. Through these longitudinal ducts, the lubricant is directed to radial outlets, which are both angularly and longitudinally disposed along the bore of the shaft 52. From certain of these longitudinal ducts lubricant is transmitted through radial outlet 221 to spiral groove 225 for the purpose of lubricating eccentric 204. From different longitudinal ducts within the shaft, lubricant is transmitted through radial outlet 222 to spiral groove 237 in the shaft head 159 for the purpose of lubricating shaft head bearing 53. Excess lubricant from this shaft bearing serves to lubricate the thrust bearing surface 114 where it is engaged by the end of the eccentric 204 on the left end of cam 110. A portion of the excess lubricant from shaft head bearing 53 is conducted through channel 231 to lubricate thrust bearing 112 for the left end of lower cam 108. From still others of the longitudinal ducts, lubricant is directed through radial outlet 223 to eccentric stud 158 for driving the needle mechanism.

While lubricant is directed to the left end of the mechanism compartment through the bore in upper shaft 52, circulating pump C forces lubricant directly through duct 255 in partition 4 above shaft 52 to vertical duct 256 in the partition. A certain portion of the lubricant transmitted to vertical duct 256 is collected by spiral groove 260 and transmitted to end thrust bearing 115 for the upper cam. A portion of the lubricant transmitted to the end thrust bearing 115 is collected by duct 264 and transmitted to the cam groove 119 for lubricating the cam roller and stud operating in that groove.

On each revolution of upper shaft 52, a measured quantity of lubricant is collected from the upper portion of duct 256 and transferred to the lower portion thereof by peripheral groove 259 extending partly around the shaft 52 and positioned to communicate with the duct 256. The lubricant thus deposited in the lower portion of duct 256 is transmitted to end thrust bearing 113 and then through ducts 261 and 263 to the cam grooves 116 and 117.

Oil thrown centrifugally from the cams in the mechanism compartment is collected in sufficient quantity on the frame cap to provide lubrication for the upper and lower looper carriers movably mounted on the frame cap. This oil provides lubricant for the bearing on the inner face of guide bar 148 as well as guide rails 146 and 147. Also, sufficient oil is deposited on the rod 143 to provide lubrication for the looper carrier as it slides longitudinally of the rod.

All of the oil directed to mechanism in the mechanism compartment 2 gradually flows by gravity to the lower portion of that compartment. After passing through filter 24, this oil is collected in sump 22 and transmitted toward the right side thereof where it passes into duct 26. Operation of the lower shaft 45 actuates scavenging pump S which lifts the lubricant from duct 26 through duct 29 and discharges it into the upper portion of the reservoir compartment 3. Thus, an adequate supply of oil is maintained in the reservoir compartment and oil is constantly removed from it and directed to the operating parts of the machine both within and outside the mechanism compartment 2. With the arrangement described, oil in adequate but not excessive amounts is provided for all of the working parts of the machine. The reservoir supply is provided without increasing the overall height of the machine by arranging the reservoir compartment at one side of the mechanism compartment and first transferring oil from the sump to the reservoir and then from the reservoir back to the mechanism compartment.

What is claimed is:

1. An overseaming machine comprising a frame, a mechanism compartment in said frame, a lubricant reservoir, a shaft extending through said mechanism compartment, said shaft being formed with a longitudinal bore, trimming mechanism in said mechanism compartment operated by rotation of said shaft, means supplying lubricant from said reservoir to said bore at one end of said shaft, a duct formed in said shaft extending from said bore to the periphery of said shaft and communicating with said trimming mechanism for supplying lubricant to said trimming mechanism, needle operating mechanism outside of said mechanism compartment operated by the other end of said shaft, and means supplying lubricant from said bore to said needle mechanism.

2. An overseaming machine comprising a frame, a mechanism compartment in said frame, a lubricant reservoir, a shaft extending through said mechanism compartment, said shaft being formed with a longitudinal bore, trimming mechanism in said mechanism compartment operated by rotation of said shaft, a transparent dome on said frame, means feeding lubricant from said reservoir to said dome, means supplying lubricant from said dome to said bore at one end of said shaft, a duct formed in said shaft extending from said bore to the periphery of said shaft and communicating with said trimming mechanism for supplying lubricant to said trimming mechanism, needle operating mechanism outside of said mechanism compartment operated by the other end of said shaft, and means supplying lubricant from said bore to said needle mechanism.

3. An overseaming machine comprising a frame, a mechanism compartment in said frame having a lower portion for collecting lubricant discharged from mechanism in said compartment, a lubricant containing reservoir located adjacent one side of said compartment, a shaft extending through said mechanism compartment, said shaft being formed with a longitudinal bore, trimming mechanism in said mechanism compartment operated by rotation of said shaft, means supplying lubricant from said reservoir to said bore at one end of said shaft, a duct in said shaft communicating with said bore for supplying lubricant to said trimming mechanism, and means including a pump for elevating lubricant from the lower portion of said compartment to said reservoir.

4. An overseaming machine comprising a frame, a mechanism compartment in said frame having a lower portion for collecting lubricant discharged from mechanism in said compartment, a lubricant containing reservoir located adjacent one side of said compartment, a shaft extending through said mechanism compartment, said shaft being formed with a longitudinal bore, trimming mechanism in said compartment operated by rotation of said shaft, means supplying lubricant from said reservoir to said bore at one end of said shaft, a duct in said shaft communicating with said bore for supplying lubricant to said mechanism, needle mechanism outside of said mechanism compartment operated by the other end of said shaft, means for supplying lubricant from said bore to said needle mechanism, and means including a pump for transferring lubricant collected in the lower portion of said mechanism compartment to said reservoir.

5. In a sewing machine, a frame, a mechanism compartment in said frame, a sump at the bottom of said mechanism compartment for collecting lubricant discharged from mechanism in said compartment, a lubricant containing reservoir located adjacent one side of said compartment, means including a pump for transferring lubricant collected in the said sump to said reservoir, and means including a pump for circulating lubricant from said reservoir to mechanism in said compartment.

6. In a sewing machine, a frame, a mechanism compartment in said frame, a reservoir adjacent said mechanism compartment, means for pumping lubricant from the lower portion of said compartment into said reservoir, a transparent dome in said frame, means for pumping lubricant from said reservoir to said dome, and means for circulating lubricant from said dome to mechanism in said compartment.

7. In a sewing machine, a frame, a mechanism compartment in said frame having a lower portion for collecting lubricant discharged from mechanism in said compartment, a hollow shaft in said mechanism compartment, a lubricant containing reservoir located adjacent one side of said compartment, means including a pump for transferring lubricant collected in the lower portion of said compartment into said reservoir, and means including a pump for transferring lubricant from said reservoir to the interior of said shaft for circulation to mechanism in said compartment.

8. In a sewing machine, a frame, a mechanism compartment in said frame having a lower portion for collecting lubricant discharged from mechanism in said compartment, a lubricant containing reservoir adjacent said mechanism compartment, a hollow shaft extending through said mechanism compartment, means including a pump for transferring lubricant collected in the lower portion of said compartment into said reservoir, a transparent dome in said frame, means including a pump for conducting lubricant from said reservoir to said dome, and means for conducting lubricant from said dome to the interior of said shaft for circulation to mechanism in said compartment.

9. In a sewing machine, a frame, a mechanism compartment in said frame having a lower portion for collecting lubricant discharged from mechanism in said compartment, a lubricant containing reservoir adjacent said mechanism compartment, a shaft extending through said mechanism compartment and having a longitudinal bore, a transparent dome in said frame, means including a pump for transferring lubricant collected in the lower portion of said compartment into said reservoir, means including a pump for conducting lubricant from said reservoir to said dome, and a spout having a portion beneath said dome and a portion extending into one end of said shaft for collecting lubricant from said dome and conducting lubricant into the bore of said shaft for circulation to mechanism in said compartment.

10. In a sewing machine, a frame, a mechanism compartment in said frame having a lower portion for collecting lubricant discharged from mechanism in said compartment, a lubricant containing reservoir adjacent said compartment, means including a pump for transferring lubricant collected in the lower portion of said compartment into said reservoir, a shaft extending through said compartment and having a longitudinal bore, means including a pump for conducting lubricant from said reservoir to the bore of said shaft, and a radial duct in said shaft for transferring lubricant from said bore to mechanism in said compartment.

11. In a sewing machine, a frame, a mechanism compartment in said frame having a lower portion for collecting lubricant discharged from mechanism in said compartment, a lubricant containing reservoir adjacent said compartment, means including a pump for transferring lubricant collected in the lower portion of said compartment into said reservoir, a shaft extending through said mechanism compartment and having a longitudinal bore, a spout extending into the bore of said shaft, a radial duct in said shaft for transferring lubricant from said bore to mechanism in said compartment, and means for conducting lubricant from said reservoir to said spout for circulation through the bore of said shaft and said duct.

12. In a sewing machine, a frame, a mechanism compartment in said frame, a reservoir adjacent said mechanism compartment, an upper shaft extending through said mechanism compartment and having a longitudinal bore, a lower shaft extending through said mechanism compartment below said upper shaft, means including a pump driven by said upper shaft for elevating lubricant from the lower portion of said compartment into said reservoir, means including a pump driven by said upper shaft for circulating lubricant from said reservoir through the bore in said shaft to mechanism in said compartment, and duct means in said frame between said shafts for circulating lubricant to said lower shaft.

13. In a sewing machine, a frame, mechanism compartment in said frame having a lower portion for collecting lubricant discharged from mechanism in said compartment, a lubricant containing reservoir adjacent said mechanism compartment, a shaft extending through said mechanism compartment and having a longitudinal bore, a lubricant chamber above an open end of said shaft, means including a pump for transferring lubricant collected in the lower portion of said compartment into said reservoir, and means including a pump for circulating lubricant from said reservoir into said chamber and through said shaft to mechanism in said compartment.

14. In a sewing machine, a frame, a mechanism compartment in said frame having a lower portion for collecting lubricant discharged from mechanism in said compartment, a lubricant containing reservoir located adjacent one side of said mechanism compartment, a shaft extending through said mechanism compartment and having a longitudinal bore, a lubricant conductor having a spout extending into the bore of said shaft and a trough portion extending from said spout, a lubricant chamber above said trough, means including a pump for transferring lubricant collected in the lower portion of said compartment into said reservoir, and means including a pump for circulating lubricant from said reservoir to said chamber for collection by said trough and distribution through the bore of said shaft to mechanism in said compartment.

15. In a sewing machine, a frame, a mechanism compartment in said frame having a lower portion for collecting lubricant discharged from mechanism in said compartment, a lubricant containing reservoir adjacent said mechanism compartment having a normal level higher than the bottom of said compartment, a shaft extending through said mechanism compartment and having a longitudinal bore, a lubricant chamber at an open end of said shaft, a lubricant conductor having a spout extending into the bore of said shaft and a trough disposed in said chamber, means including a pump for transferring lubricant collected in the lower portion of said compartment into said reservoir, means for conducting lubricant from said reservoir to said chamber for collection by said trough and distribution along said spout through the bore of said shaft to mechanism in said compartment, and an overflow port for returning excess lubricant from said chamber to said reservoir.

16. In a sewing machine, a frame, a mechanism compartment in said frame having a lower portion for collecting lubricant discharged from mechanism in said compartment, a lubricant containing reservoir adjacent said mechanism compartment, a shaft extending through said mechanism compartment and having a longitudinal bore, a lubricant chamber at the open end of said shaft, a transparent dome above said chamber, means including a pump for elevating lubricant from said reservoir into said dome, a lubricant conductor having a trough for collecting lubricant in said chamber and a spout for transferring lubricant to the bore in said shaft for circulation to mechanism in said compartment, and means including a pump for transferring lubricant collected in the lower portion of said compartment into said reservoir.

17. In a sewing machine, a frame, a mechanism compartment in said frame, a reservoir adjacent said mechanism compartment for containing lubricant, a chamber in said frame, an upper shaft extending through said compartment and having a longitudinal bore with an exposed end in said chamber, a lower shaft extending through said mechanism compartment, means including a pump driven by said upper shaft for supplying lubricant from said reservoir to said chamber, a conductor in said chamber for collecting lubricant and supplying lubricant to the bore of said shaft, a radial duct in said shaft for transferring lubricant from said bore to mechanism in said compartment, ducts in said frame for conducting lubricant from said upper shaft to said lower shaft, and means including a pump driven by said lower shaft for elevating lubricant from the lower portion of said compartment into said reservoir.

18. In a sewing machine, a frame having a central partition separating a mechanism compartment from a reservoir compartment, a duct extending from the lower portion of said mechanism compartment to the upper portion of said reservoir compartment, a pump connected to said duct for pumping lubricant from said mechanism compartment into said reservoir compartment, a second duct extending from said reservoir to a chamber in said frame above said reservoir, a second pump connected to said second duct for pumping lubricant from said reservoir into said chamber, and means for circulating lubricant from said chamber to mechanism in said mechanism compartment.

19. In a sewing machine, a frame having a central partition separating a mechanism compartment from a reservoir compartment, a duct in said frame extending from the lower portion of said mechanism compartment to the upper portion of said reservoir compartment, a pump connected to said duct for pumping lubricant from said mechanism compartment into said reservoir compartment, a chamber in said frame above said reservoir, a transparent dome over said chamber, a second duct extending from said reservoir into said dome, a second pump connected to said second duct for pumping lubricant from said reservoir into said dome, and means for distributing lubricant collected in said chamber from said dome to mechanism in said mechanism compartment.

20. In a sewing machine, a frame, a partition in said frame separating a mechanism compartment from a reservoir compartment, a duct extending from the lower portion of said mechanism compartment to the upper portion of said reservoir compartment, a pump connected to said duct for pumping lubricant from said mechanism compartment into said reservoir compartment, a lubricant chamber in said frame above said reservoir, a second duct extending from said reservoir compartment into said chamber, a second pump connected to said second duct for pumping lubricant from said reservoir compartment into said chamber for circulation to mechanism in said mechanism compartment, and a sight gauge in the side wall of said reservoir compartment for indicating the oil level in said reservoir compartment.

21. In a sewing machine, a frame, a partition in said frame separating a mechanism compartment from a reservoir compartment, a duct extending from the lower portion of said mechanism compartment to the upper portion of said reservoir compartment, a pump connected to said duct for pumping lubricant from said mechanism compartment into said reservoir compartment, a chamber in said frame above said reservoir compartment, a shaft extending through said mechanism compartment into said chamber and having a longitudinal bore, a second duct extending from said reservoir compartment into said chamber, and a second pump connected to said second duct for pumping lubricant from said reservoir compartment into said chamber for distribution through said bore to mechanism in said mechanism compartment.

22. In a sewing machine, a frame, a partition in said frame separating a mechanism compartment from a reservoir compartment, a duct extending from the lower portion of said mechanism compartment into said reservoir compartment, a pump connected to said duct for pumping lubricant from said mechanism compartment into said reservoir compartment, a chamber in said frame above said reservoir compartment, a shaft extending through said mechanism compartment and having a longitudinal bore, a lubricant conductor in said chamber for conducting lubricant into the bore of said shaft for distribution through said bore to mechanism in said mechanism compartment, a second duct extending from said reservoir compartment into said chamber, and a second pump connected to said second duct for pumping lubricant from said reservoir compartment into said second duct for distribution to mechanism in said mechanism compartment.

23. In a sewing machine, a frame, a partition in said frame separating a mechanism compartment from a reservoir compartment, a duct extending from the lower portion of said mechanism compartment into said reservoir compartment, a pump connected to said duct for pumping lubricant from said mechanism compartment into said reservoir compartment, a chamber in said frame above said reservoir compartment, a shaft extending through said mechanism compartment and having a longitudinal bore, a lubricant conductor in said chamber having a trough for collecting lubricant in said chamber and a spout for conducting lubricant into the bore of said shaft for distribution through said bore to mechanism in said mechanism compartment, a second duct extending from said reservoir compartment into said chamber, and a second pump connected to said second duct for pumping lubricant from said reservoir compartment into said second duct for distribution to mechanism in said mechanism compartment.

24. In a sewing machine, a frame, a partition in said frame separating a mechanism compartment and a reservoir compartment, a duct extending from the lower portion of said mechanism compartment to the upper portion of said reservoir compartment, a pump connected to said duct for pumping lubricant from said mechanism compartment into said reservoir compartment, a lubricant distributing chamber in said frame above said reservoir compartment, a shaft extending through said mechanism compartment to said chamber and having a longitudinal bore, a second duct extending from said reservoir compartment to said chamber, a second pump connected to said second duct for pumping lubricant from said reservoir compartment to said chamber, a conductor in said chamber having a trough for collecting lubricant and a spout for conducting lubricant into the bore of said shaft for distribution through said bore to mechanism in said mechanism compartment, and an overflow port in said chamber for returning lubricant to said reservoir compartment.

25. In a sewing machine, a frame having a central partition separating a mechanism compartment and a reservoir compartment, a sump at the bottom of said mechanism compartment, a duct extending from said sump to the upper portion of said reservoir compartment, a pump connected to said duct for pumping lubricant from said sump to said reservoir compartment, a second duct extending from said reservoir to a chamber in said frame above said reservoir, a second pump connected to said second duct for pumping lubricant from said reservoir into said chamber, and means for circulating lubricant from said chamber to mechanism in said compartment.

26. In a sewing machine, a frame having a central partition separating a mechanism compartment from a reservoir compartment, a sump at the bottom of said mechanism compartment, a filter overlying said sump, a duct extending from said sump to the upper portion of said reservoir compartment, a pump connected to said duct for pumping lubricant from said mechanism compartment into said reservoir compartment, a second duct extending from said reservoir compartment to a chamber in said frame above said reservoir, a second pump connected to said second duct for pumping lubricant from said reservoir into said chamber, and means for circulating lubricant from said chamber to mechanism in said mechanism compartment.

27. In a sewing machine, a frame having a central partition separating a mechanism compartment and a reservoir compartment, a sump at the bottom of said mechanism compartment, a duct extending from said sump to the upper portion of said reservoir compartment, a pump connected to said duct for pumping lubricant from said sump to said reservoir compartment, a chamber in said frame above said reservoir compartment, a shaft extending through said mechanism compartment into said chamber and having a longitudinal bore, a second duct extending from said reservoir compartment into said chamber, and a second pump for pumping lubricant from said reservoir compartment into said chamber for distribution through said bore to mechanism in said mechanism compartment.

28. In a sewing machine, a frame, a partition in said frame separating a mechanism compartment from a reservoir compartment, a sump at the bottom of said mechanism compartment, a duct extending from said sump to the upper portion of said reservoir compartment, a pump connected to said duct for pumping lubricant from said sump to said reservoir compartment, a chamber in said frame above said reservoir compartment, a shaft extending through said mechanism compartment into said chamber and having a longitudinal bore, a second duct extending from said reservoir compartment into said chamber, a second pump for pumping lubricant from said reservoir compartment into said chamber for distribution through said bore to mechanism in said mechanism compartment, and an overflow port for returning excess lubricant from said chamber to said reservoir compartment.

29. In a sewing machine, a frame, a partition in said frame separating a mechanism compartment from a reservoir compartment, a sump at the bottom of said mechanism compartment, a duct extending from said sump to the upper portion of said reservoir compartment, a pump connected to said duct for pumping lubricant from said sump to said reservoir compartment, a chamber in said frame above said reservoir compartment, a shaft extending through said mechanism compartment into said chamber and having a longitudinal bore, a second duct extending from said reservoir compartment into said chamber, a second pump for pumping lubricant from said reservoir compartment into said chamber, a conductor having a trough in said chamber for receiving lubricant from said second duct, and a spout extending from said conductor into said bore for distributing lubricant through said bore to mechanism in said mechanism compartment.

30. In a sewing machine, a frame having a central partition separating a mechanism compartment from a reservoir compartment, upper and lower shafts extending through said mechanism compartment and supported in bearings in said frame, a first pump means operated by one of said shafts for transferring lubricant from the bottom of said mechanism compartment to the upper portion of said reservoir compartment, and a second pump means operated by one of said shafts for supplying lubricant from reservoir compartment to said mechanism in said mechanism compartment.

31. In a sewing machine, a frame having a central partition separating a mechanism compartment from a reservoir compartment, upper and lower shafts extending through said mechanism compartment and supported in bearings in said frame, a first pump means operated by said lower shaft for transferring lubricant from the bottom of said mechanism compartment to the upper portion of said reservoir compartment, a duct in said frame intersecting the bearings for both of said shafts, and a second pump means operated by said upper shaft for supplying lubricant from said reservoir compartment to said duct to lubricate said bearings in said frame.

32. In a sewing machine, a frame having a central partition separating a mechanism compartment from a reservoir compartment, upper and lower shafts extending through said mechanism compartment and supported in bearings in said frame, upper and lower cams respectively mounted on said shafts and engaging thrust bearings on the mechanism compartment side of said partition, a first pump means driven by said lower shaft for transferring lubricant from the bottom of said mechanism compartment to the upper portion of said reservoir compartment, a duct in said partition intersecting the bearings for both of said shafts, means for conducting lubricant from said duct to the thrust bearings on the mechanism compartment side of said partition, and a second pump means driven by said upper shaft for supplying lubricant from said reservoir compartment to said duct.

33. In a sewing machine, a frame having a central partition separating a mechanism compartment from a reservoir compartment, upper and lower shafts extending through said mechanism compartment and supported in bearings in said frame, upper and lower cylindrical cams respectively mounted on said upper and lower shafts and engaging thrust bearings on the mechanism compartment side of said partition, a first pump means for transferring lubricant from the bottom of said mechanism compartment to the upper portion of said reservoir compartment, a duct in said partition intersecitng the bearings for both of said shafts, lubricant conveying means for transferring lubricant from said duct to said thrust bearings, a second pump means for supplying lubricant from said reservoir to said duct, said cam cylinders being provided with peripheral cam grooves and formed with longitudinally extending ducts arranged to supply lubricant from said thrust bearings to said cam grooves.

34. In a sewing machine, a frame having a central partition separating a mechanism compartment from a reservoir compartment, upper and lower shafts extending through said mechanism compartment and supported in bearings in said frame, a first pump means for transferring lubricant from the lower portion of said mechanism compartment to the upper portion of said reservoir compartment, a first duct in said partition intersecting the bearings for said shafts, a second pump means for transferring lubricant from said reservoir, and a second duct connected to said second pump means and extending to said first duct above said upper shaft, said upper shaft being formed with a metering groove extending partially around its periphery in the plane of the intersection of said first duct, lubricant being supplied by said second pump means through said second duct to said metering groove and thence through said first duct to the bearing for the lower shaft for subsequent distribution in said mechanism compartment.

35. In a sewing machine, the apparatus defined in claim 34 wherein said first and second pump means are respectively driven by said lower and upper shafts.

36. In a sewing machine, the apparatus defined in claim 34 wherein said upper shaft is formed with a spiral groove extending between the ends of said metering groove and beyond the partition into said mechanism compartment for transferring lubricant from said second duct into said mechanism compartment.

37. In a sewing machine, a frame, a mechanism compartment in said frame, a reservoir compartment in said frame adjacent said mechanism compartment, a bottom closure for said mechanism compartment detachably secured to said frame, and a separate bottom closure for said reservoir compartment, said bottom closures forming the base of the machine.

38. In a sewing machine, a frame, a mechanism compartment in said frame, a reservoir compartment in said frame adjacent said mechanism compartment, separate closures for said compartments, said closures being releasably secured to said frame and forming the base of the machine, and a pump for transferring lubricant from said mechanism compartment to said reservoir compartment.

39. In a sewing machine, a frame, a mechanism compartment in said frame, a reservoir compartment in said frame adjacent said mechanism compartment, a bottom closure for said mechanism compartment releasably secured to said frame, a sump formed in said closure, and a separate bottom closure for said reservoir compartment releasably secured to said frame, said bottom closures forming the base of the machine.

40. In a sewing machine, the apparatus defined in claim 39 wherein a filter is interposed between mechanism in said mechanism compartment and the sump in said bottom closure.

41. In a sewing machine, a frame, a mechanism compartment in said frame, a reservoir compartment in said frame adjacent said mechanism compartment, separate bottom closures for said compartments forming the base of the machine, said closures being individually releasably secured to said frame, a sump formed in the bottom closure at said mechanism compartment, a filter covering said sump, and pump means connected to said sump for pumping lubricant from said sump into said reservoir compartment.

42. In a sewing machine, a frame, mechanism carried by said frame, means for lubricating said mechanism, a bottom closure on said frame, means releasably securing said closure to said frame, said closure being formed with apertures, and feet smaller than said apertures secured to said frame and extending through said apertures, said closure being removable from said frame independently of said feet.

43. In a sewing machine, a frame, mechanism carried by said frame, a bottom closure releasably secured to said frame, said bottom closure being formed with apertures extending therethrough, and feet smaller than said apertures secured to said frame and extending through said apertures beneath said bottom closure to support said frame and closure above a table.

44. In a sewing machine, a frame, a mechanism compartment in said frame, a reservoir compartment in said frame adjacent said mechanism compartment, separate bottom closures for said compartments releasably secured to said frame, both closures being formed with apertures extending therethrough, and feet smaller than said apertures secured to said frame and extending through said apertures beneath said bottom closures to support said closures above a table top.

45. In a sewing machine having a frame with a reservoir compartment, a bottom plate removably secured to said frame and forming a bottom for said compartment, said plate having a bore extending from one edge thereof and terminating beneath the reservoir compartment, said bore being counterbored to form a valve seat, threads formed in the counterbore at its outer end, inlet and outlet ports communicating respectively with said bore and counterbore, a valve stem having threads engaging the threaded outer end of said counterbore, and an elongated resilient sleeve secured to said valve stem and engageable with said valve seat.

46. In a lubrication system having a shaft with a longitudinal bore for distributing lubricant to mechanism operated by the shaft, and a bearing surrounding one end of the shaft with a vertically disposed passage extending upwardly from the bearing for conducting lubricant from a chamber above the bearing, a lubricant conductor comprising a cylindrical base adapted to be fitted in said bearing, said base being formed with a transverse pocket positioned to be disposed beneath said passage for collecting lubricant thereupon, said base being formed with a longitudinal trough intersecting said pocket and extending longitudinally therefrom, and a spout extending from one end of said base and being formed with a longitudinal channel communicating with said trough, said spout being arranged to enter the bore of the shaft for conducting lubricant from said trough along said channel into said bore of the shaft.

47. In a lubrication system having a shaft with a plurality of ducts extending from a recess at one end for distributing lubricant to mechanism operated by the shaft, a lubricant conductor comprising a cylindrical base having a longitudinal trough formed in its upper portion, and a spout extending from said trough into said recess and engaging the end wall thereof for conveying lubricant to the center of the wall and into said ducts.

48. In a lubrication system having a shaft formed with a recess at one end and a plurality of ducts extending longitudinally from the end wall of the recess for distributing lubricant to mechanism operated by the shaft, a lubricant conductor comprising a cylindrical base having a longitudinal trough in its upper portion, a spout communicating with said trough and extending into engagement with the center of the end wall of the recess in said shaft, and a key and keyway cooperating in said base and the bearing surrounding said base for preventing relative rotation thereof.

49. In a lubrication system having a lubricant conductor as defined in claim 47, a spring acting on the end of said conductor opposite said spout for resiliently urging said spout into engagement with the end wall of said recess.

50. In a lubrication system having a lubricant conductor as defined in claim 49 wherein the end of said spout is provided with a point engaging the center of the end wall of said recess.

51. In a sewing machine, a rotary shaft having a longitudinal bore extending from one end, a rod within said bore, said rod having a plurality of longitudinally extending ribs on its periphery forming grooves between adjacent ribs, the peripheral edges of said ribs contacting the inner periphery of said bore to provide a plurality of longitudinally extending parallel lubricant transmitting ducts, a plurality of radial outlets in said shaft communicating with said bore, said outlets being constantly in communication with one or more of the grooves in said rod, and means for supplying lubricant to said ducts.

52. In a sewing machine, a rotary shaft having a longitudinal bore extending from one end, a rod within said bore having one end spaced inwardly from the corresponding end of said shaft, said rod having a plurality of longitudinally extending ribs with their peripheral edges engaging the inner periphery of said bore to provide a plurality of longitudinal lubricant transmitting ducts, a plurality of radial outlets in said shaft communicating with different ducts for feeding lubricant to the periphery of said shaft, and means for supplying lubricant to said bore at said one end of said shaft.

53. In a sewing machine, a rotary shaft having a longitudinal bore extending from one end, a rod within said bore having one end spaced inwardly from said one end of the shaft to provide a recess within said one end of the shaft, a plurality of longitudinally extending ribs on said rod engaging the inner periphery of said bore to form a plurality of longitudinally extending lubricant directing ducts, radial outlets in said shaft communicating with said bore and angularly displaced to communicate with different ones of said ducts, a lubricant conductor extending into said recess and engaging said one end of said rod, and means for supplying lubricant to said conductor.

54. In a sewing machine, a rotary shaft provided with a longitudinal bore and with a radial outlet leading from said bore, a bearing for said shaft having lubricant conducting connections with said outlet, means for conducting oil longitudinally of said shaft bore toward said outlet comprising a rod within the shaft bore and having longitudinally extending ribs forming grooves between adjacent ribs, the peripheral edges of said ribs engaging the periphery of said bore to form with the inner periphery thereof longitudinal oil directing ducts, with one or more of said ducts constantly in communication with said radial outlet leading from the shaft bore, and means for supplying lubricant to said bore at one end of said rod.

55. In a sewing machine, a rotary shaft provided with a longitudinal bore and with a radial outlet leading from said bore, a bearing for said shaft having lubricant conducting connections with said outlet, means for conducting oil longitudinally of said shaft bore toward said outlet comprising a rod within the shaft bore and having longitudinally extending ribs on its periphery forming grooves between adjacent ribs, the peripheral edges of said ribs being in engagement with the inner periphery of said bore to form therewith a plurality of longitudinal oil directing ducts, said rod having one end spaced inwardly from the end of said shaft, one or more of said ducts being constantly in communication with said radial outlet leading from the shaft bore, and means for supplying lubricant to said bore at the end of said shaft from which said rod is spaced.

56. In a sewing machine, a rotary actuating shaft provided with a longitudinal bore and with a radial outlet leading from said bore, a bearing having lubricant conducting connections with said outlet, means for conducting oil longitudinally of said shaft bore toward said outlet comprising a rod within the shaft bore and having longitudinally extending ribs engaged with the inner periphery of said bore and forming therewith a plurality of longitudinally extending oil directing ducts, one end of said rod being spaced inwardly from the end of said shaft spaced from said bearing, one or more of said ducts being constantly in communication with said radial outlet leading from the shaft bore, an oil conductor extending into said shaft bore and engaging said one end of said rod, and means for supplying oil to said conductor.

57. In a sewing machine, a frame having a shaft receiving bore, a screw closing said frame bore at one end, a rotary shaft provided with a longitudinal bore and radial outlets leading from said bore, said shaft being disposed in said frame bore, means for conducting oil longitudinally of said shaft bore to said outlets comprising a rod within said shaft bore, said rod having longitudinally extending ribs engaging the inner periphery of said shaft bore to form therewith a plurality of oil directing ducts, an oil conductor disposed in said frame bore comprising a cylindrical base engaging the walls of said frame bore, a trough for collecting oil, a spout extending from one end of the trough into said shaft bore and engaging said rod, and a spring interposed between said screw and said base for yieldably urging said spout into engagement with said rod.

58. In a sewing machine, a rotary shaft having a longitudinal bore extending from one end, a rod within said bore, said rod having longitudinally extending ribs engaging the inner periphery of said bore and forming therewith a plurality of longitudinally extending lubricant directing ducts, and a plurality of angularly displaced radial outlets in said shaft communicating with said bore, said outlets being constantly in communication with different ones of said ducts, and means for supplying lubricant to said ducts.

59. In a sewing machine, a rotary shaft provided with a longitudinal bore and with a plurality of angularly displaced radial outlets leading from said bore, means for conducting oil longitudinally of said shaft bore toward said outlets comprising a rod within the shaft bore having a plurality of longitudinally extending ribs engaging the inner periphery of said bore and forming therewith a plurality of longitudinally extending oil directing ducts, said ducts being constantly in communication with different ones of said radial outlets leading from said shaft bore, and means for supplying lubricant to said bore at one end of said rod.

60. In a sewing machine, a shaft having a longitudinal bore, an eccentric on said shaft, the surface of said eccentric being formed with a helical groove, and duct means extending from said bore to said groove at the low part of said eccentric.

61. In a sewing machine, a shaft having a longitudinal bore, an eccentric on said shaft, the surface of said eccentric being formed with a helical groove having an intermediate portion at the low part of said eccentric, and duct means extending from said bore to said groove at the low part of said eccentric.

62. In a sewing machine, a shaft having a longitudinal bore, an eccentric on said shaft, the surface of said eccentric being formed with a helical groove having an intermediate portion at the low part of said eccentric and end portions at the ends of said eccentric, and duct means extending from said bore to said groove at the low part of said eccentric.

63. In a sewing machine, a shaft having a longitudinal bore, an eccentric on said shaft, a hub at one end of said eccentric larger than said eccentric, the surface of said eccentric being formed with a helical groove, said hub being formed with a clearance groove about the end of said eccentric, duct means extending from said bore to said helical groove at the low part of said eccentric, said helical groove communicating with said clearance groove at a higher part of said eccentric.

64. In a sewing machine, a shaft having a longitudinal bore, an eccentric on said shaft, a hub at one end of said eccentric larger than said eccentric, the side of said hub being formed with a clearance groove around the end of said eccentric, the surface of said eccentric being formed with a helical groove having an intermediate portion at the low part of said eccentric and end portions at the ends of said eccentric, said hub being formed with a radial outlet communicating with said clearance groove next one end of said helical groove, and duct means extending from said bore to said helical groove at the low part of said eccentric.

65. In a sewing machine, a shaft having a longitudinal bore, a journal on said shaft supported in a bearing, an eccentric on said shaft having one end adjacent said journal, a hub on said shaft forming a shoulder at the opposite end of said eccentric, the side wall or shoulder of said hub being formed with a clearance groove around said eccentric, duct means extending from said bore to a helical groove in the surface of said journal, the surface of said eccentric being formed with a helical groove extending from said journal at a radius corresponding to the radius of said journal to said clearance groove, said hub being formed with a radial outlet extending from said clearance groove at the end of the helical groove in said eccentric, and duct means extending from said bore to the helical groove at the low part of said eccentric.

66. In a sewing machine, a frame, an upper shaft journaled in said frame, said upper shaft being formed with a longitudinal bore, a lower shaft journaled in said frame beneath said upper shaft, a duct within the wall of said frame and extending between said shafts, means supplying lubricant from said upper shaft bore to said duct, a journal on said lower shaft being formed with a helical groove extending along said journal through said wall of said frame and communicating with said duct, and an eccentric mounted on said shaft outside of said frame, said eccentric being formed with a helical groove communicating with the groove in said shaft journal.

67. In a sewing machine, a frame, a shaft journaled in said frame and extending beyond one end thereof, a feed mechanism mounted on said one end of said frame and driven by said shaft, means supplying lubricant to said feed mechanism, a housing enclosing said mechanism for confining lubricant thrown from said mechanism, said housing having an inclined floor extending downwardly toward said frame, said one end of said frame below said shaft being formed with a channel extending across said end, said inclined floor terminating within said channel so lubricant is conveyed from said housing, to said channel, and means returning lubricant from said channel to the interior of said frame.

68. In a sewing machine, a frame, a shaft journaled in said frame and extending beyond one end thereof, a feed mechanism mounted on said one end of the frame and driven by said shaft, a housing enclosing said feed mechanism, a door closing the exposed end of said housing, the bottom of said door having a beveled edge inclined downwardly toward said frame and overlying the floor of said housing said floor being inclined downwardly toward said frame and terminating in a channel extending transversely across said end of said frame, and means for conveying lubricant from said channel to the interior of said frame.

69. In a sewing machine, a frame, a looper carrier mounted on a frame cap closing an opening in said frame, rotating mechanism in said frame opposite said cap, and a ledge on said cap above said carrier, said ledge being formed with a channel sloping downwardly in a direction away from the looper on said carrier for conveying lubricant discharged by said mechanism away from the looper.

70. In a sewing machine, a frame, a looper carrier mounted on a frame cap closing an opening in said frame, rotating mechanism within said frame opposite said cap, and a horizontal ledge on the interior of said cap above said carrier, said ledge being formed with a channel for collecting lubricant thrown from said mechanism, said ledge being formed at its end opposite the looper on said carrier with a transverse channel intersecting said first named channel, said first named channel sloping downwardly toward said second named channel for conveying lubricant to said second named channel in a direction away from the looper.

71. In a sewing machine, a frame, a frame cap closing an opening in said frame, a block mounted on the inner face of said cap and having an upper ledge extending horizontally across said inner face, a looper carrier mounted on said block, and cam mechanism in said frame for operating said looper carrier, said ledge being formed with a lubricant collecting channel sloping downwardly in a direction away from the looper on said carrier, said ledge being formed with a transverse channel extending across a low portion of said sloping channel at the end of said ledge opposite the looper on said carrier, said frame cap being formed with a vertical channel intersecting said transverse channel for conducting lubricant toward the bottom of said frame cap for discharge to a sump in the bottom of said frame.

72. In a sewing machine, a frame, a frame cap closing an opening in said frame, the juncture of said frame cap with said frame at one side of said cap being adjacent rotary gears within said frame, and a guard interposed between said gears and said juncture and secured to one of said frame elements, said guard presenting a surface opposed to said gears for collecting lubricant discharged therefrom and deflecting said lubricant to the bottom of said frame.

73. In a sewing machine, the apparatus defined in claim 72 wherein said frame cap and guard while in assembled relation are removable from the frame.

74. In a sewing machine having a frame with a pair of gears rotating about vertically spaced axes in said frame and a removable frame cap closing an opening in said frame, abutting parts of said frame and frame cap forming a vertical juncture in a plane offset slightly from an end thrust surface of the frame engaged by said gears; a guard secured to said frame cap, said guard having side walls extending toward the axes about which said gears rotate and a wall intermediate said side walls, said intermediate wall intersecting the plane defined by said end thrust surface for the purpose of collecting lubricant discharged from the gears and deflecting said lubricant to the bottom of said frame.

75. In a sewing machine, the apparatus defined in claim 74 wherein said intermediate wall has its upper portion terminating substantially at the top of said juncture and its lower portion extending below the bottom of said juncture for the purpose of collecting lubricant discharged from the gears and deflecting said lubricant to the bottom of said frame.

76. In a sewing machine having a frame with a pair of cams rotating about vertically spaced parallel axes within said frame; a collector interposed between said cams for collecting lubricant thrown therefrom, said collector comprising a relatively thin plate secured to the back wall of said frame and extending substantially horizontally between said cams to a point adjacent mechanism on the front of the frame.

77. In a sewing machine, a frame with a pair of cams rotating about vertically spaced parallel axes within said frame and having a frame cap closing a front opening in said frame with mechanism on said frame cap operated by said cams, said mechanism including a guide bar extending horizontally across the interior of said cap; a lubricant collector interposed between said cams, said collector comprising a relatively thin plate secured to the back wall of said frame and extending substantially horizontally between said cams, said plate having one end following the contour of a corresponding end of said frame and having its front edge cooperating with the contour of said guide bar to form a substantially continuous surface between said cams for collecting lubricant discharged therefrom.

78. In a sewing machine, the apparatus defined in claim 77 wherein an opening is provided between the frame cap and said one end of the frame, said lubricant collector being formed with a projection extending toward said opening to collect lubricant thrown in the direction of said opening.

79. In a sewing machine, the apparatus defined in claim 78 wherein said lubricant collector is inclined downwardly toward said rear wall of the frame.

80. In a sewing machine, the apparatus defined in claim 78 wherein said lubricant collector is formed with a trough adjacent said rear wall of the frame and the portion of said collector between said cams slopes downwardly toward said trough.

81. In a sewing machine, the apparatus defined in claim 78 wherein said lubricant collector inclines downwardly toward a trough along the rear wall of said frame, and said trough inclines downwardly in a direction parallel to said rear wall for discharging lubricant to the bottom of said frame.

82. In an overseaming machine having a frame, a frame cap closing an opening in the front of said frame, one edge of said cap and one end of said frame defining an aperture at said one end of the frame, movable cutter and looper members projecting through said aperture, a removable closure having an end wall extending from said one edge of the cap and an integral vertical wall secured to said one end of the frame partially closing said opening, said closure having an inclined bottom wall extending to the front of said frame; a lubrication guard of relatively thin material comprising an end wall secured to said one edge of the frame cap and contiguous to the end wall of said closure, an integral wall disposed behind said vertical wall of the closure, and an inclined bottom wall disposed behind the said bottom wall of the closure.

83. In an overseaming machine, the apparatus defined in claim 82 wherein the end wall of said guard has its front edge abutting a shoulder at the front of said frame cap.

84. In an overseaming machine, the apparatus defined in claim 82 wherein said inclined bottom wall of the guard has its front edge abutting a shoulder at the front of the frame near the bottom thereof.

85. In an overseaming machine, the apparatus defined in claim 82 wherein said inclined bottom wall of the guard is formed with an aperture providing access to an adjustment for a looper member behind said wall.

86. In an overseaming machine, the apparatus defined in claim 82 wherein the front edge of the inclined bottom wall of said guard has a depending lip for deflecting lubricant to a ledge near the bottom of the frame inclined toward the interior thereof.

87. In an overseaming machine, the apparatus defined in claim 82 wherein said vertical wall of the guard has extending from its back a shield for deflecting lubricant from an end of a cam member to the interior of said frame.

88. In a sewing machine, a frame, a frame cap closing an opening in said frame, mechanism on said frame cap, said frame cap being formed with an opening through which a thread take-up projects; a lubricant guard of relatively thin material for preventing discharge of lubricant through said opening, said guard comprising a base secured to the frame cap below said opening, an intermediate wall extending from said base away from said frame cap and an upstanding wall extending upwardly from said intermediate wall to a point above said opening.

89. In a sewing machine, the apparatus defined in claim 88 wherein the intermediate wall of said lubricant guard is inclined downwardly toward the frame cap.

90. In a sewing machine having a frame with a frame cap closing an opening in said frame and an opening in the frame cap through which a thread take-up projects; a lubricant guard for the opening in the frame cap comprising a base on the frame cap below and at one side of the opening therein, an intermediate wall extending outwardly from said frame cap, an upstanding wall extending upwardly from said intermediate wall to a point above said opening, said intermediate wall being inclined downwardly toward the frame cap, and an extension from said intermediate wall at one side of the guard extending beneath the opening in the frame cap.

91. In a sewing machine, the apparatus defined in claim 90 wherein the extension is positioned above said intermediate wall and a shoulder extends upwardly from the end of the intermediate wall to the extension.

92. In a sewing machine, a frame with a frame cap closing an opening in the frame, said frame cap being formed with an opening through which a thread take-up projects; a lubricant guard for preventing discharge of oil through the opening in the frame cap, said guard comprising a base secured to said frame cap below the opening therein, an intermediate wall extending outwardly and upwardly from said base, and an upstanding wall extending from said intermediate wall to a point above the opening in said frame cap, said guard being formed with apertures at the juncture of said intermediate wall with said base providing for discharge of lubricant from the inclined intermediate wall to the bottom of the frame.

93. In a sewing machine, a frame, a frame cap closing an opening in said frame, a looper carrier mounted on said frame cap and having an arm extending parallel to said frame cap and spaced therefrom; a lubricant collector for removing excess lubricant from said arm, said collector comprising a base secured to the frame cap, an intermediate wall extending from said base outwardly from the frame cap to a point near the lower end of said arm, and an upstanding wall extending upwardly from said intermediate wall in sliding engagement with a surface on said arm.

94. In a sewing machine, a frame, a frame cap closing an opening in said frame, a looper pivoted on the inner face of said frame cap, and a rib extending upwardly from the bottom of the frame engaging said inner face of the frame cap, said rib being formed was a recess for accommodating the hub on said looper carrier, said recess being flared inwardly from said frame cap for facilitating return of lubricant to the interior of the frame.

95. In a sewing machine, the apparatus defined in claim 94 wherein said rib is formed with a channel extending along the bottom at the front side thereof, said channel communicating at one end with said recess.

96. In a sewing machine, a frame, a compartment within said frame, mechanism mounted on one end of said frame, means supplying lubricant to said mechanism, and means defining a channel extending across said one end of the frame beneath said mechanism, said channel being inclined upwardly in both directions from the center of the frame, and a duct for conducting lubricant from said channel to the compartment within said frame.

97. In a sewing machine, a frame, a compartment within said frame, mechanism on one end of said frame, means supplying lubricant to said mechanism and an aperture at said one end of the frame, a closure for said aperture, said closure extending along the front of said frame, and means defining a channel formed in said one end of the frame below said mechanism, said channel sloping upwardly in both directions from the center of said one end of the frame, and a channel along the front of said frame beneath said closure communicating with the channel in said one end, and a duct for conducting lubricant from the channel in said one end to the compartment in said frame.

98. In a sewing machine, a frame, a compartment within said frame, mechanism mounted on one end of said frame, means supplying lubricant to said mechanism, a housing on the back of said frame, mechanism in said housing, means for supplying lubricant to said housing, means defining a first channel in said one end of the frame beneath the mechanism on said end, said channel being inclined upwardly in both directions from the center of said one end, means defining a second channel on the back of said frame beneath said housing inclined downwardly toward said one end and communicating with said first channel, and a duct for conducting lubricant from said first channel to said compartment in the frame.

99. In a sewing machine having a frame, a frame cap closing an opening in said frame, a guide bar spaced from said frame cap, a looper carrier reciprocable between said guide bar and said cap; a lubricant collector for intercepting lubricant thrown by mechanism within said frame and for removing lubricant from said carrier, said collector comprising a relatively thin plate secured to said guide bar and extending downwardly toward said looper carrier, the bottom edge of said collector sloping downwardly in a direction away from the looper on said carrier.

100. In a sewing machine, a frame, a frame cap closing and opening in said frame, a looper carrier block mounted on said frame cap, a looper carrier reciprocable on said block, means supplying lubricant to said looper carrier, an opening between said frame and said cap through which a looper projects from said carrier, the bottom edge of said block being inclined downwardly from said opening to induce flow of lubricant away from said opening into a sump at the bottom of the frame.

101. In a sewing machine, the apparatus defined in claim 100 wherein said frame cap is formed with a channel on its inner surface which channel extends downwardly from a lower part of the inclined bottom of said block.

102. In a sewing machine, a frame, a frame cap closing an opening in said frame, a looper carrier block mounted on said frame cap, said frame and frame cap defining an opening at one end of said block, a guide bar, a foot on said guide bar secured to said block adjacent said opening and supporting said guide bar in spaced relation to said block, a looper carrier slidable between said guide bar and said block with a looper projecting through said opening, and bottom surfaces on said foot and the adjacent part of said block inclined downwardly away from said opening for inducing the flow of lubricant away from said opening.

103. In a sewing machine, the apparatus defined in claim 102 wherein said frame cap has formed on its inner surface a channel extending downwardly from a low part of the bottom of said block.

104. In a sewing machine, a frame, a compartment within said frame, a needle carrier pivotally mounted on the outer face of one end of said frame, a head mounted on said one end of the frame partially encircling said needle carrier, a fabric guard mounted on said head and having a side wall extending forwardly at one side of said needle carrier, and a lubricant guard on said fabric guard, said lubricant guard having a back wall with one edge contiguous to the outer face of said head, said back wall extending vertically behind said needle carrier, said lubricant guard having a side wall spaced from said head and extending forwardly from said back wall.

105. In a sewing machine, a frame, a shaft journaled in said frame, a needle carrier pivoted on the outer surface of said one end of said frame and driven by said shaft, means supplying lubricant through said shaft to said needle carrier, and a lubricant guard supported by said frame and extending downwardly in front of said needle carrier.

106. In a sewing machine, a frame, a shaft journaled in said frame, a needle carrier pivotally mounted on the outer face of one end of said frame and driven by said shaft, means supplying lubricant through said shaft to said needle carrier, a head supported on said one end of the frame and extending above said needle carrier, and a lubricant guard secured to said head above said needle carrier and extending downwardly in front of said needle carrier.

107. In a sewing machine, a frame having an opening therein, a frame cap closing said opening, a rib extending upwardly from the bottom of said frame in engagement with the back surface of said frame cap, said rib having its upper edge inclined downwardly from said frame cap, and means defining a channel in said frame along the bottom of said rib at the front side thereof, said channel communicating with the interior of the frame.

References Cited in the file of this patent

UNITED STATES PATENTS

| | | |
|---|---|---|
| 1,200,881 | Sargent | Oct. 10, 1916 |
| 1,312,412 | Moffatt | Aug. 5, 1919 |
| 1,331,638 | Green | Feb. 24, 1920 |
| 1,420,082 | Dowd | June 20, 1922 |
| 1,594,274 | Smith | July 27, 1926 |
| 1,634,123 | Taub | June 28, 1927 |
| 1,698,241 | Retschy | Jan. 8, 1929 |
| 1,741,454 | Feldman | Dec. 31, 1929 |
| 1,877,823 | Crites | Sept. 20, 1932 |
| 1,983,631 | Merrow | Dec. 11, 1934 |
| 2,085,814 | Matthews et al. | July 6, 1937 |
| 2,134,903 | Young | Nov. 1, 1938 |
| 2,145,825 | Weis | Jan. 31, 1939 |
| 2,188,003 | Gates | Jan. 23, 1940 |
| 2,190,254 | Caproni | Feb. 13, 1940 |
| 2,202,817 | Sardu | June 4, 1940 |
| 2,206,285 | Kaier | July 2, 1940 |
| 2,238,796 | Knaus | Apr. 15, 1941 |
| 2,247,127 | Knaus | June 24, 1941 |
| 2,263,786 | Rumpp | Nov. 25, 1941 |
| 2,311,604 | Zeier | Feb. 16, 1943 |
| 2,325,928 | Zeier | Aug. 3, 1943 |
| 2,345,992 | Sauer | Apr. 4, 1944 |
| 2,430,369 | Sauer | Nov. 4, 1947 |
| 2,505,330 | Karle | Apr. 25, 1950 |
| 2,511,047 | Christensen et al. | June 13, 1950 |
| 2,584,243 | Washburn | Feb. 5, 1952 |
| 2,596,728 | Sauer et al. | May 13, 1952 |

FOREIGN PATENTS

| | | |
|---|---|---|
| 932,408 | France | Mar. 22, 1948 |